United States Patent
Kang et al.

(10) Patent No.: US 10,370,477 B2
(45) Date of Patent: *Aug. 6, 2019

(54) BROAD WAVELENGTH RANGE CHEMICALLY TUNABLE PHOTONIC MATERIALS

(71) Applicant: Massachusetts Institute of Technology, Cambridge, MA (US)

(72) Inventors: Youngjong Kang, Kyounggi-Do (KR); Joseph Walish, Cambridge, MA (US); Edwin L. Thomas, Houston, TX (US)

(73) Assignee: Massachusetts Institute of Technology, Cambridge, MA (US)

( * ) Notice: Subject to any disclaimer, the term of this patent is extended or adjusted under 35 U.S.C. 154(b) by 406 days.

This patent is subject to a terminal disclaimer.

(21) Appl. No.: 15/150,320

(22) Filed: May 9, 2016

(65) Prior Publication Data

US 2016/0326295 A1    Nov. 10, 2016

Related U.S. Application Data

(63) Continuation of application No. 13/495,684, filed on Jun. 13, 2012, now Pat. No. 9,360,604, which is a (Continued)

(51) Int. Cl.
*C09K 9/02* (2006.01)
*B82Y 20/00* (2011.01)
(Continued)

(52) U.S. Cl.
CPC ............ *C08F 293/00* (2013.01); *B82Y 20/00* (2013.01); *G01K 11/12* (2013.01); *G02B 1/005* (2013.01);
(Continued)

(58) Field of Classification Search
CPC ..... C08F 293/00; G02B 1/005; G02F 1/0147; G01K 11/12; C01K 11/12
See application file for complete search history.

(56) References Cited

U.S. PATENT DOCUMENTS 4,627,689 A    12/1986 Asher
4,717,378 A    1/1988 Perrault et al.
(Continued)

FOREIGN PATENT DOCUMENTS

WO    WO 09/042207 A2    4/2009

OTHER PUBLICATIONS

International Search Report and Written Opinion for PCT/US2008/011182 dated Mar. 31, 2009.
(Continued)

*Primary Examiner* — Bijan Ahvazi
(74) *Attorney, Agent, or Firm* — Wolf, Greenfield & Sacks, P.C.

(57) ABSTRACT

The present invention provides polymeric materials arranged as photonic crystals, or portions of photonic crystals, having properties which can be easily tuned over a large range of wavelengths upon exposure to an external stimulus. In some embodiments, the photonic crystals comprise at least one portion which can undergo a change in a physical, chemical, dielectric, or other property upon exposure to an altering stimulus, resulting in a change in a diffracted wavelength of electromagnetic radiation (e.g, light) by the photonic crystal. Embodiments of the invention may advantageously exhibit large stop band tunability and rapid response times. Photonic crystals of the invention may be useful in a wide variety of applications, such as colorimetric sensors, active components of simple display devices, electrically controlled tunable optically pumped laser, photonic switches, multiband filters, and the like.

18 Claims, 20 Drawing Sheets

Related U.S. Application Data continuation of application No. 12/239,520, filed on Sep. 26, 2008, now abandoned.

(60) Provisional application No. 60/995,579, filed on Sep. 27, 2007.

(51) Int. Cl.
| | |
|---|---|
| *C08F 293/00* | (2006.01) |
| *G02B 1/00* | (2006.01) |
| *G02B 5/20* | (2006.01) |
| *G01K 11/12* | (2006.01) |
| *G02F 1/01* | (2006.01) |
| *G02F 1/15* | (2019.01) |
| *G02F 1/061* | (2006.01) |

(52) U.S. Cl.
CPC .............. *G02B 5/20* (2013.01); *G02F 1/0147* (2013.01); *G02F 1/0121* (2013.01); *G02F 1/061* (2013.01); *G02F 1/15* (2013.01); *G02F 2001/164* (2019.01); *G02F 2202/022* (2013.01); *G02F 2202/32* (2013.01); *G02F 2202/36* (2013.01); *G02F 2203/023* (2013.01)

(56) References Cited

U.S. PATENT DOCUMENTS

| | | | |
|---|---|---|---|
| 5,656,205 | A | 8/1997 | Rabolt et al. |
| 5,898,004 | A | 4/1999 | Asher et al. |
| 6,180,288 | B1 | 1/2001 | Everhart et al. |
| 6,183,901 | B1 | 2/2001 | Ying et al. |
| 6,433,931 | B1 | 8/2002 | Fink et al. |
| 6,449,093 | B2 | 9/2002 | Hebrink et al. |
| 6,671,097 | B2 | 12/2003 | Fink et al. |
| 6,720,061 | B1 | 4/2004 | Port et al. |
| 9,360,604 | B2 * | 6/2016 | Kang ..................... B82Y 20/00 |
| 2003/0185532 | A1 | 10/2003 | Hosomi et al. |
| 2003/0214690 | A1 | 11/2003 | Escuti et al. |
| 2007/0106040 | A1 | 5/2007 | Ober et al. |
| 2009/0086208 | A1 | 4/2009 | Kang et al. |
| 2013/0015417 | A1 | 1/2013 | Kang et al. |

OTHER PUBLICATIONS

Arichi, S., et al., Studies of poly-2-vinylpyridine. II. Solubilities in various solvents, Bulletin of the chemical society of Japan, 39(3), 434-9 (1966).
Arsenault, A. C. et al. From colour fingerprinting to the control of photoluminescence in elastic photonic crystals. *Nat. Mater.* 5, 179-184 (2006).
Bockstaller et al., Size-selective organization of enthalpic compatibilized nanocrystals in ternary block copolymer/particle mixtures. J Am Chem Soc. May 7, 2003;125(18):5276-7. E Pub Apr. 12, 2003. DOI: 10.1021/ja034523t.
Busch et al., Liquid-Crystal Photonic-Band-Gap Materials: The tunable Electromagnetic Vacuum. Phys. Rev. Lett. Aug. 2, 1999. 83(5): 967-70. DOI: 10.1103/PhysRevLett.83.967.
Constantin et al., Diffusion coefficients in a lamellar lyotropic phase: evidence for defects connecting the surfactant structure. Phys Rev Lett. Nov. 13, 2000;85(20):4297-300.
Debord, J. D. et al. Thermoresponsive photonic crystals. *J. Phys. Chem. B* 104,6327-6331 (2000).
Deng, T., et al. "Two-dimensional block copolymer photonic crystals." *Polymer* 44, 6549-6553 (2003).
Pergason, J.L., et al. "Cholesteric Structure—II Chemical Significance." *Molecular Crystals*, vol. 1, pp. 309-323 (1966).
Foulger, S. H. et al. Photonic bandgap composites. *Adv. Mater.* 13, 1898-1901 (2001).
Fudouzi, H. et al. Photonic papers and inks: Color writing with colorless materials. Adv. Mater. 15, 892-896 (2003).

Gu, Z.-Z., et al. Photochemically Tunable Colloidal Crystals. J. Am. Chem. Soc. 122, 12387-12388 (2000).
Gu, Z.-Z., et al. Photo-reversible regulation of optical stop bands. *Adv. Mater.* 13, 1295-1 298 (2001).
Hajduk et al., Stability of the Perforated Layer (PL) Phase in Diblock Copolymer Melts. Macromolecules. 1997. 30(13): 3788-95. E Pub Jun. 30, 1997. DOI: 10.1021/ma961673y.
Hikmet, R. A. M. et al. Patterned multicolor switchable cholesteric liquid crystal gels. *Adv. Mater.* 14, 502-504 (2002).
Hikmet, R.A.M. et al., Switchable mirrors of chiral liquid crystal gels, Liquid Crystals, 26(11), 1645-53 (1999).
Holtz, J. H., et al. Polymerized colloidal crystal hydrogel films as intelligent chemical sensing materials. *Nature* 389, 829-832 (1 997).
Hu, Z., et al, Hydrogel Opals, Advanced Materials, 13(22), 1708-1712 (2001).
Kang et al., Broad-wavelength-range chemically tunable block-copolymer photonic gels. Nat Mater. Dec. 2007;6(12):957-60. Epub Oct. 21, 2007.
Kosonen, H., et al, "One-dimensional optical reflectors based on self-organization of polymeric comb-shaped supramolecules," Eur. Phys. J. E, vol. 10, pp. 69-75 (2003).
Kramer et al., The self-organizing properties of squid reflectin protein. Nat Mater. Jul. 2007;6(7):533-8. Epub Jun. 3, 2007. doi:10.1038/nmat1930.
Kumoda, M., et al., Preparations and optical properties of ordered arrays of submicron gel particles: interconnected state and trapped state, Langmuir, 22, 4403-7 (2006).
Li, Y. et al. Phase transitions of gels. *Annu. Rev. Mater. Sci.* 22, 243-277 (1992).
Li, Y. Y. et al. Polymer Replicas of Photonic Porous Silicon for Sensing and Drug Delivery Applications. Science 299, 2045-2047 (2003).
Lin et al., Sailor MJ, Ghadiri MR. A porous silicon-based optical interferometric biosensor. Science. Oct. 31, 1997;278(5339):840-3.
Matsubara, K., et al, A thermally adjustable multicolor photochromic hydrogel, Angew. Chem. Int. Ed., 46, 1688-92 (2007).
Mitov, M. et al., "Cholesteric liquid crystalline materials reflecting more than 50% of unpolarized incident light intensity.", Liquid Crystals, 34(2), 183-193 (2007).
Mitov, M. et al., Going beyond the reflectance limit of cholesteric liquid crystals, Nature Materials 5, 361-364 (2006).
Ohmine et al., Salt effects on the phase transition of Ionic Gels. J. Chem. Phys. Aug. 10, 1982. 77(11): 5725-29.
Osuji, C. et al. Temperature-dependent photonic bandgap in a self-assembled hydrogen-bonded liquid-crystalline diblock copolymer. *Adv. Funct. Mater.* 12, 753-758 (2002).
Ozaki, M., et al. "Electric field tuning of the stop band in a liquid-crystal-infiltrated polymer inverse opal." *Adv. Mater.* vol. 14, No. 7, pp. 514-518 (2002).
Pendry et al., A Calculation of photon dispersion relations. Phys. Rev. Lett. Nov. 9, 1992. 69(19): 2772-5.
Rancon et al., Fluctuations and phase transformations in a lyotropic liquid crystal. J Phys Chem. 1988. 92: 6339-44.
Shimoda, Y., et al. "Electric field tuning of a stop band in a reflection spectrum of synthetic opal infiltrated with nematic liquid crystal." Applied Physics Letters, vol. 79, No. 22, pp. 3627-3629 (2001).
Starodoubtsev et al., Evidence for Polyelectrolyte/Ionomer Behavior in Collapse of Polycationic Gels. Macromolecules. 1995. 28: 3930-6.
Tanaka et al., Gels. Scientific America. 1981. 244(1): 124-138. doi:10.1038/scientificamerican0181-124.
Temelkuran, B., et al. Low-loss infrared dielectric material system for broadband dual-range omnidirectional reflectivity. Opt. Lett. 26, 1370-1 372 (2001).
Thomas et al., Periodic area-minimizing surfaces in block copolymers. Nature. 1988. 334: 598-601.
Ueno, K., et al., "An electro- and thermochromic hydrogel as a full color indicator," Advanced Materials, 19, 2807-12 (2007).
Urbas, A. et al. "Tunable block copolymer/homopolymer photonic crystals." *Adv. Mater*, 12, 812-814 (2000).
Urbas, A. M., et al. "Bicontinuous cubic block copolymer photonic crystals." Adv. Mater. 14, 1850-1853 (2002).

(56) References Cited

OTHER PUBLICATIONS

Valkama, S. et al. Self-assembled polymeric solid films with temperature-induced large and reversible photonic-bandgap switching. *Nat. Mater.* 3, 872-876 (2004).
Weissman, J.M., et al, Thermally switchable periodicities and diffraction from mesoscopically ordered materials, Science, 274, 959-960 (1996).
White, M.A. et al., Thermochromism in commercial products, Journal of Chemical Education, 76(9), 1201-5 (1999).
Xia, J., et al. Electric-field-induced rejection wavelength tuning of photonic-bandgap composites. *Adv. Mater.* 17, 2463-2467 (2005).
Xu, X., et al. Mesoscopic Monodisperse Ferromagnetic Colloids Enable Magnetically Controlled Photonic Crystals. *J. Am. Chem. Soc.* 124, 13864-1 3868 (2002).
Yoon, J.S., et al., Thermochromic block copolymer photonic gel, submitted to Angewandte Chemie, Apr. 2008.
Zhou, J., et al, Thermally tuning of the photonic band gap of $SiO2$ colloid-crystal infilled with ferroelectric $BaTiO_3$, Applied Physics Letters, 78(5), 661-663, (2001).

* cited by examiner

BROAD WAVELENGTH RANGE CHEMICALLY TUNABLE PHOTONIC MATERIALS

RELATED APPLICATIONS

This application is a continuation of U.S. patent application Ser. No. 13/495,684, filed Jun. 13, 2012, and entitled "Broad Wavelength Range Chemically-Tunable Photonic Materials," which is a continuation of U.S. patent application Ser. No. 12/239,520, filed Sep. 26, 2008, entitled "Broad Wavelength Range Chemically-Tunable Photonic Materials," by Kang, et al., which claims the benefit of U.S. Provisional Patent Application Ser. No. 60/995,579, filed Sep. 27, 2007, entitled "Broad Wavelength Range Chemically-Tunable Photonic Materials," by Kang, et al., each of which is incorporated herein by reference in its entirety for all purposes.

STATEMENT REGARDING FEDERALLY SPONSORED RESEARCH OR DEVELOPMENT

This invention was made with Government support under Grant No. DMR0308133 awarded by the National Science Foundation (NSF), Grant No. DAAD19-02-D-0002 awarded by the Army Research Office (ARO) and Grant No. HR0011-04-C-0042 awarded by the Defense Advanced Research Projects Agency (DARPA). The Government has certain rights in the invention.

FIELD OF THE INVENTION

The present invention generally relates to photonic crystals which are responsive to an external stimulus, and related methods.

BACKGROUND OF THE INVENTION

Photonic crystals (PCs) with tunability in the visible or near infrared region are of interest for controlling and processing light for active components of display, sensory or telecommunication devices. The position of a stop-band can be modulated either by changing the refractive index and/or the periodicity of the PC structure. Various tunable PCs have been demonstrated and many of these are based on colloidal crystal arrays (CCA). Block copolymers have also been used as a material platform for creating PC structures where self-assembly of high molecular weight block copolymers (BCP) yields 1D, 2D and 3D periodic PC from lamellae, hexagonally packed cylinders and double gyroid microdomain structures. Limited tunability of BCP PC has been accomplished via addition of homopolymers to change the domain spacing with the addition and selective sequestration of nanoparticles for manipulation of the refractive index, resulting in shifts of about 100~200 nm of the stop band position.

Accordingly, improved methods are needed.

SUMMARY OF THE INVENTION

The present invention relates to photonic crystals comprising a polymeric article including a periodic structure of a plurality of periodically occurring separate domains able to interact with and affect electromagnetic radiation, with at least a first and a second domain each having an electromagnetic radiation-affecting dimension of at least 5 nm, and each having a dielectric constant such that the domains define a dielectric constant ratio of at least about 1.01 for at least one range of continuous wavelengths lying within a range of from about 10 nm to about 10 microns wherein, in the presence of an altering stimulus, the dielectric constant and/or the electromagnetic radiation-affecting dimension of one of the domains changes relative to that of the other such that a diffracted wavelength of electromagnetic radiation changes by at least 45% at a set point of observation relative to the photonic crystal.

The present invention also relates to photonic crystals comprising a polymeric article including a periodic structure of a plurality of periodically occurring separate domains able to interact with and affect electromagnetic radiation, with at least a first and a second domain each having an electromagnetic radiation-affecting dimension of at least 5 nm, and each having a dielectric constant such that the domains define a dielectric constant ratio of at least about 1.01 for at least one range of continuous wavelengths lying within a range of from about 10 nm to about 10 microns wherein, in the presence of an altering stimulus, the dielectric constant and/or the radiation-affecting dimension of one of the domains changes relative to that of the other such that a diffracted wavelength of electromagnetic radiation, having a diffracted wavelength greater than 700 nm, changes by at least 10 nm at a set point of observation relative to the photonic crystal.

The present invention also provides methods comprising providing a composition comprising a block copolymer arranged in a periodic structure of periodically occurring separate domains, with at least a first and a second domain, each having an electromagnetic radiation-affecting dimension and able to interact with and affect electromagnetic radiation, and each having a dielectric constant such that the domains define a dielectric constant ratio of at least about 1.01 for at least one range of continuous wavelengths lying within a range of from about 10 nm to about 10 microns, and wherein, in the presence of an altering stimulus, the block copolymer is capable of undergoing a change in dielectric constant and/or an electromagnetic radiation-affecting dimension in the absence of a hydrogen-bonding additive associated with the block copolymer; exposing the composition to an altering stimulus such that the dielectric constant and/or the electromagnetic radiation-affecting dimension of at least one of the domains changes relative to that of the other, at a set point of observation relative to the crystal; and observing the change in the electromagnetic radiation-affecting dimension.

The present invention also provides methods comprising providing a composition consisting essentially of a block copolymer arranged in a periodic structure of periodically occurring separate domains, with at least a first and a second domain, each having an electromagnetic radiation-affecting dimension and able to interact with and affect electromagnetic radiation, and each having a dielectric constant such that the domains define a dielectric constant ratio of at least about 1.01 for at least one range of continuous wavelengths lying within a range of from about 10 nm to about 10 microns; exposing the composition to an altering stimulus such that the dielectric constant and/or the electromagnetic radiation-affecting dimension of at least one of the domains changes relative to that of the other, at a set point of observation relative to the crystal; and observing the change in the electromagnetic radiation-affecting dimension.

The present invention also provides methods comprising providing a photonic crystal comprising a polymeric article including a periodic structure of a plurality of periodically occurring separate domains able to interact with and affect electromagnetic radiation, with at least a first and a second domain each having an electromagnetic radiation-affecting dimension of at least 5 nm, and each having a dielectric constant such that the domains define a dielectric constant ratio of at least about 1.01 for at least one range of continuous wavelengths lying within a range of from about 10 nm to about 10 microns; and exposing the photonic crystal to an altering stimulus thereby causing the dielectric constant and/or the electromagnetic radiation-affecting dimension of one of the domains to change relative to that of the other such that a diffracted wavelength of electromagnetic radiation changes by at least 45% at a set point of observation relative to the photonic crystal.

In some embodiments, a photonic material is provided comprising a polymeric article defining a periodic structure of a plurality of periodically occurring separate domains, wherein the photonic material is able to interact with and affect incident electromagnetic radiation in a way that is dependent upon the level of exposure of the photonic material to an altering stimulus, and after exposing the photonic material to a predetermined temperature, the photonic material is irreversibly changed such that the affected electromagnetic radiation is no longer dependent upon the level of exposure of the photonic material to the altering stimulus.

In some embodiments, a photonic material is provided that comprises a polymeric article defining a periodic structure of a plurality of periodically occurring separate domains, wherein the photonic material is able to interact with and affect incident electromagnetic radiation in a way that is dependent upon the level of exposure of the article to an altering stimulus, and the dependence of the affected electromagnetic radiation upon the level of exposure of the photonic material to an altering stimulus is preserved below a temperature of 20° C.

In some embodiments, a method is described wherein the method comprises exposing a temperature sensor to variations in temperature, in a first case above, or in a second case below a predetermined temperature, and determining variations in temperature via the sensor; exposing the sensor to a temperature in the first case above, or in the second case below the predetermined temperature, at which the sensor loses its ability to signal variations in temperature; and determining, via the sensor, the predetermined temperature, and determining that the sensor has in the first case been raised above, or in the second case lowered below, the predetermined temperature.

In some embodiments, a method is described wherein the method comprises providing a temperature sensor comprising a polymeric article comprising a periodic structure of a plurality of periodically occurring separate domains, able to interact with and affect incident electromagnetic radiation and to produce a signal indicative of temperature; exposing the temperature sensor to variations in temperature in a first case below, or in a second case above a predetermined temperature, and determining variations in temperature via the sensor; exposing the sensor to a temperature in the first case above, or in the second case below the predetermined temperature, at which the sensor loses its ability to signal variations in temperature; and determining, via the sensor, that the sensor has in the first case been raised above, or in the second case lowered below the predetermined temperature.

The present invention also provides methods comprising providing a photonic crystal comprising a polymeric article including a periodic structure of a plurality of periodically occurring separate domains able to interact with and affect electromagnetic radiation, with at least a first and a second domain each having an electromagnetic radiation-affecting dimension of at least 5 nm, and each having a dielectric constant such that the domains define a dielectric constant ratio of at least about 1.01 for at least one range of continuous wavelengths lying within a range of from about 10 nm to about 10 microns; and exposing the photonic crystal to an altering stimulus thereby causing the dielectric constant and/or the radiation-affecting dimension of one of the domains to change relative to that of the other such that a diffracted wavelength of electromagnetic radiation, having a diffracted wavelength greater than 700 nm, changes by at least 10 nm at a set point of observation relative to the photonic crystal.

Figure 1:
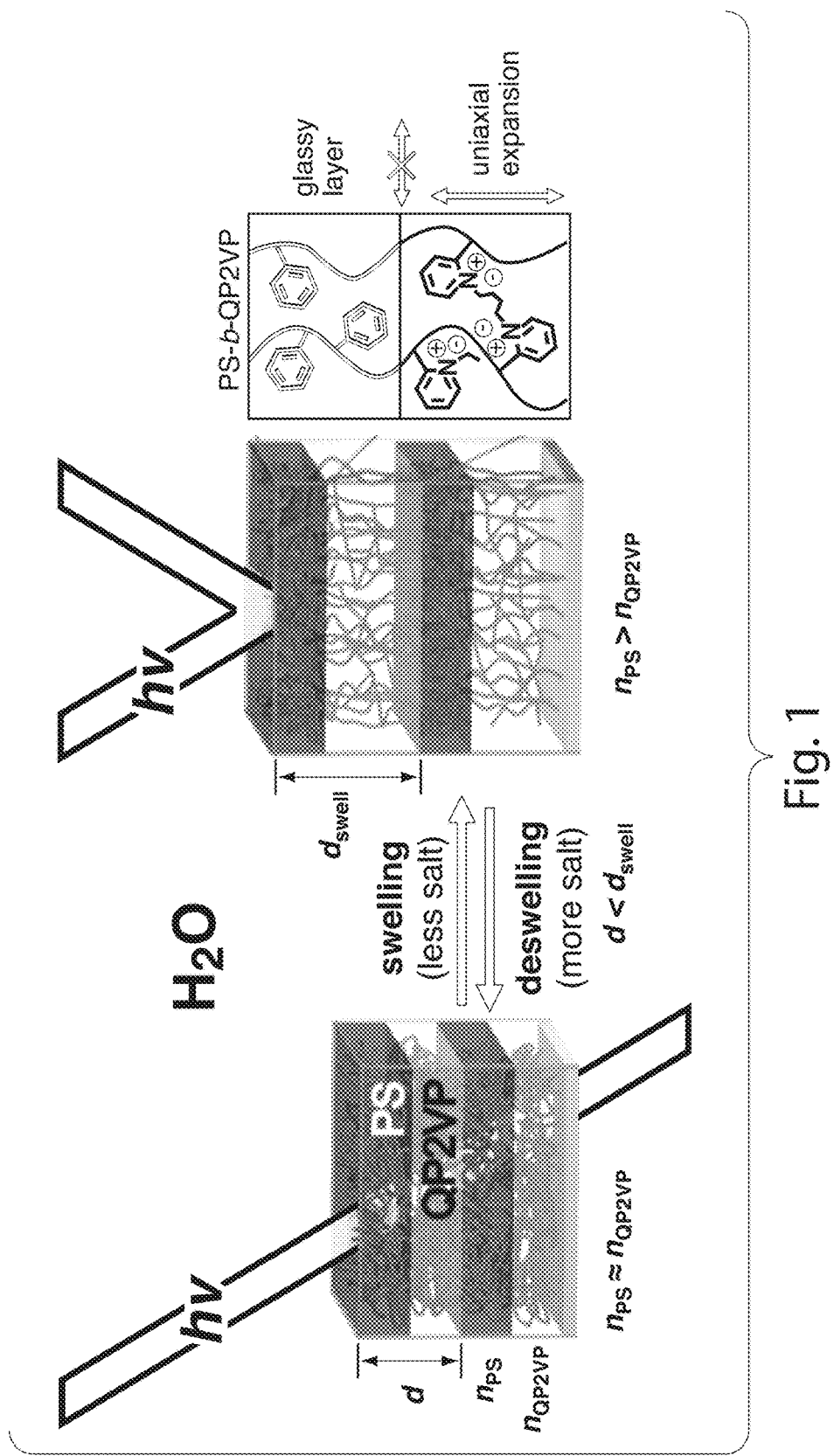
FIG. 1 shows, schematically, swelling and de-swelling of a photonic crystal comprising a gel domain, according to one embodiment of the invention.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present invention provides polymeric materials arranged as photonic crystals, or portions of photonic crystals, having properties which can be easily tuned over a large range of wavelengths upon exposure to an external stimulus. Specifically, the invention provides photonic crystals having at least one portion which can undergo a change in a physical, chemical, dielectric, or other property upon exposure to an altering stimulus, resulting in a change in a diffracted wavelength of electromagnetic radiation (e.g, light) by the photonic crystal. Some embodiments of the invention may advantageously exhibit high stop band tunability and rapid response times. Photonic crystals of the invention may be useful in a wide variety of applications, such as colorimetric sensors, active components of simple display devices, electrically controlled tunable optically pumped laser, photonic switches, multiband filters, and the like.

An advantageous feature of the invention is the ability of some embodiments to exhibit exceptionally large stop band tunability. That is, some embodiments of the invention may be capable of diffracting and/or reflecting electromagnetic radiation over a larger wavelength range relative to known photonic crystals. For example, a photonic crystal of the invention may diffract electromagnetic radiation including visible, ultraviolet, infrared, microwave radiation, and the like. In some cases, the a photonic crystal of the invention may diffract electromagnetic radiation having a wavelength between 100-1600 nm. In some embodiments, the invention provides photonic crystals capable of exhibiting exceptionally large shifts in wavelength, such as a 600% shift in some cases, upon exposure to an external stimulus.

As used herein, the term "photonic crystal" refers to a material that can control the propagation of electromagnetic radiation based on a periodic assembly of domains having different dielectric constants. The particular structural arrangement of separate domains of the material, and dielectric constants of those domains, may result in the reflection of electromagnetic radiation of a particular frequency directed at the material in at least one direction. The structural arrangement and dielectric constants of separate domains that make up these materials may form photonic materials that diffract or reflect light centered around a particular frequency or frequencies. "Photonic crystal" and "photonic material" are used interchangeably herein, and refer to the same class of materials.

In some embodiments, the present invention provides photonic crystals, wherein at least a portion of the photonic crystal comprises a material capable of undergoing a change in at least one physical, chemical, or dielectric characteristic, including dimension, shape, dielectric constant, refractive index, color, or the like, in response to a stimulus. In some cases, the change may be a dimensional change (e.g., volumetric change). For example, the dimensional change may comprise swelling or de-swelling of a portion of the photonic crystal. The change in dimension may affect the structural arrangement of the photonic crystal, thereby affecting the dielectric constant of at least one portion of the photonic crystal or the electromagnetic radiation reflected by the photonic crystal (e.g., an electromagnetic radiation-affecting dimension). For example, the electromagnetic radiation-affecting dimension may relate to the spacing between like domains in a periodic structure. In some embodiments, the photonic crystal may comprise a first portion responsive to an altering stimulus, wherein the stimulus causes a change in volume or other dimension of the first portion, and a second portion which is not responsive to the external stimulus, or is responsive to a different extent than the first portion.

In some cases, the first portion and the second portion may undergo an increase in volume upon exposure to a stimulus. In some cases, the first portion and the second portion may undergo a decrease in volume upon exposure to a stimulus. The first and second portions may undergo a similar change (e.g., increase, decrease) in volume or the portions may undergo a differential change in volume. In some cases, the first portion of the photonic crystal may increase in volume and the second portion may decrease in volume, upon exposure to a stimulus. Photonic crystals of the invention, or portions thereof, may also undergo other dimensional changes, such as change in length, width, height, thickness, etc. Another advantageous feature of some embodiments of the invention is the ability of the photonic crystals to undergo a change in an electromagnetic radiation-affecting dimension, upon exposure to a stimulus, without the need for addition of an agent to enhance the dimension-changing ability of the photonic crystal, as described more fully below.

In some embodiments, the photonic crystal may comprise a polymeric article. The polymeric article may include a periodic structure of a plurality of periodically occurring separate domains. Each domain may have a dielectric constant, such that the domains define a dielectric constant ratio that is not equal to 1.0. That is, a first domain or set of domains may have a dielectric constant that is different from the dielectric constant of a second domain or set of domains. For example, the dielectric constant ratio may be at least about 1.01 for at least one range of continuous wavelengths lying within a range of from about 10 nm to about 10 microns. In some embodiments, the dielectric constant ratio is at least about 1.05, 1.1, 1.25, 1.5, 1.75, 2.0, 5.0, 10.0, or, in some cases, greater, for a selected range of continuous wavelengths. In some embodiments, the dielectric constant ratio may be at least about 1.001 for at least one range of continuous wavelengths lying within a range of from about 10 nm to about 10 microns. In some cases, the value of the dielectric constant ratio may vary for different ranges of continuous wavelengths. However, the dielectric constant values for different domains in the periodic structure may remain such that the dielectric constant ratio for the different domains is not equal to 1.0, over different ranges of continuous wavelengths. In some cases, the at least one range of continuous wavelengths may be, for example, from about 300-700 nm (e.g., visible light). In some cases, at least one range of continuous wavelengths may be from about 700-1600 nm (e.g., near infrared region, infrared region), or from about 1000 microns-10 cm (e.g., microwave region).

The domains of the periodic structure may be arranged such that they are able to interact with and affect electromagnetic radiation, as described herein, and may have an electromagnetic radiation-affecting dimension of at least 5 nm. In some cases, the electromagnetic radiation-affecting dimension may be from about 5 nm to about 5000 nm, or, in some cases, from about 5 nm to about 1500 nm.

As described herein, changes in the electromagnetic radiation-affecting dimension upon exposure to an altering stimulus may affect one or more characteristics of the domains. For example, the dielectric constant of one or more domains may change upon exposure to an altering stimulus. In some cases, one or more dimensions of the domains may increase (e.g., swell) or decrease (e.g., de-swell) upon exposure to an altering stimulus, such as a solvent. In some cases, the volume of a domain or set of domains may increase or decrease. For example, the polymeric article may be exposed to a solvent, wherein the solvent interacts with (e.g, is absorbed by) at least one domain, resulting in an increase in volume of the domain. The polymeric article may then be exposed to a different solvent, or the same solvent in a different amount or concentration, resulting in an additional increase or a decrease in the volume of the domain. In some cases, the change in at least one dimension of a domain, upon exposure to an altering stimulus, may affect the spacing between like domains in a periodic structure. The change in one or more dimensions of the domains may, in some embodiments, affect the dielectric constant and/or refractive indices of the domains.

Changes in the dielectric constant and/or electromagnetic radiation-affecting dimension upon exposure to an altering stimulus may also affect the electromagnetic radiation that interacts with the domains. For example, the polymeric article may interact with electromagnetic radiation to produce (e.g., reflect, diffract) a diffracted wavelength of electromagnetic radiation, and, upon exposure to an altering stimulus, the polymeric article may undergo a change in dielectric constant and/or a radiation-affecting dimension as described herein such that a different diffracted wavelength of electromagnetic radiation is produced. In some cases, the difference in the diffracted wavelength of electromagnetic radiation may be due to changes in the periodicity and/or spacing of domains with the periodic structure.

In some embodiments, the radiation-affecting dimension of at least one domain changes relative to that of the other such that a diffracted wavelength of electromagnetic radiation changes by at least 10 nm, at least 25 nm, at least 50 nm, at least 75 nm, at least 100 nm, at least 150 nm, at least 200 nm, at least 250 nm, or greater, at a set point of observation relative to the photonic crystal, upon exposure to an altering stimulus. The change in the diffracted wavelength may be a blue-shifted change, i.e., the diffracted wavelength may be shifted to a shorter wavelength. In some cases, the change in the diffracted wavelength may be a red-shifted change, i.e., the diffracted wavelength may be shifted to a shorter wavelength. In one set of embodiments, the polymeric article may produce a diffracted wavelength greater than 700 nm (e.g., a diffracted wavelength in the infrared region or microwave region), and, upon exposure to an altering stimulus, the diffracted wavelength changes by at least 10 nm at a set point of observation relative to the photonic crystal.

In some embodiments, in the presence of an altering stimulus, the radiation-affecting dimension of at least one domain may undergo an even larger shift in diffracted wavelength. For example, the radiation-affecting dimension of one of the domains may change relative to that of the other such that a diffracted wavelength of electromagnetic radiation changes by at least 45%, relative to the diffracted wavelength prior to addition of or absent the altering stimulus, at a set point of observation relative to the photonic crystal. In some cases, the diffracted wavelength of electromagnetic radiation changes by at least 50%, 75%, 100%, 150%, 200%, 250%, 300%, 350%, 400%, 450%, 500%, 550%, 600%, 650%, 700%, or, in some cases, greater, at a set point of observation relative to the photonic crystal. In some embodiments, the change in the diffracted wavelength of electromagnetic radiation may be visible by sight, i.e., may be a colorimetric change.

In an illustrative embodiment, a photonic crystal comprising a lamellar stack of alternating polystyrene and quaternized-poly(2-vinyl pyridine) (QP2VP) layers may be immersed in neat water and may diffract electromagnetic radiation such that the photonic crystal appears red-orange by sight. Swelling/de-swelling by decreasing/adding salt can provide an effective way to dynamically modulate the optical properties of the photonic crystal. Exposure of the photonic crystal to an aqueous $NH_4Cl$ solution (1.0 M) may cause contraction of the QP2VP such that the color of the photonic crystal changes from red-orange to blue, by sight. Subsequent exposure of the photonic crystal to neat water to flush away the aqueous $NH_4Cl$ solution may re-swell the QP2VP layers such that the photonic crystal again appears red-orange. In some cases, the photonic gels may exhibit a rapid, sub-second response time upon exposure to the altering stimulus. In some cases, the rapid response time may be attributed to pores and the dislocation defects in the periodic structure (e.g., lamellar structure) which can advantageously act as effective high transport channels, for example, for moving aqueous solvents and ions across the periodic structure.

It should be understood that photonic crystals of the invention may also produce changes in the diffracted wavelength of electromagnetic radiation, wherein the change is less than 50%, less than 25%, or less than 10%. For example, a photonic crystal may diffract electromagnetic radiation having a wavelength greater than 700 nm (e.g., infrared region, microwave region), wherein, in the presence of an altering stimulus, the radiation-affecting dimension of one of the domains may change relative to that of the other such that a diffracted wavelength of electromagnetic radiation changes by about 1%, 5%, 10%, 25%, or greater, at a set point of observation relative to the photonic crystal. As described herein, the percent change in diffracted wavelength may be calculated according to the following formula, $$[(\lambda_f - \lambda_o)/\lambda_o] \times 100 = \% \text{ change in diffracted wavelength,}$$

wherein $\lambda_o$ is the peak of the diffracted wavelength prior to addition of or absent the altering stimulus and $\lambda_f$ is the peak of the diffracted wavelength upon to exposure to the altering stimulus.

In some embodiments, the polymeric article comprises a block copolymer arranged in a periodic structure of periodically occurring separate domains, with at least a first and a second domain, each having dielectric constants in a dielectric constant ratio as described herein. The use of block copolymers may be advantageous as a wide range of periodic structures may be formed by self-assembly of domains in a block copolymer. For example, the block copolymer may form lamellar, spherical, cylindrical, continuous (e.g., gyroid) and multi-continuous (e.g., double gyroid) morphologies, and the like. Those of ordinary skill in the art would understand the meaning of these terms.

The block copolymer may be selected such that at least one domain is capable of undergoing a change in an electromagnetic radiation-affecting dimension. In some cases, the block copolymer comprises a domain comprising a gel or polyelectrolyte, or a material capable of forming a gel or polyelectrolyte upon contact with a fluid. As used herein, the term "gel" is given its ordinary meaning in the art and refers to a material comprising a polymer network that is able to trap and contain fluids. The gel may comprise polymer chains that are crosslinked, either directly or via a cross-linking agent. The degree of crosslinking may be varied, in some cases, to tailor the extent to which the gel absorbs or retains fluids. The gel may also be responsive to one or more external stimuli, as described more fully below. Those of ordinary skill in the art would be able to select appropriate material suitable for use as gels. As used herein, the term "polyelectrolyte" refers to polymeric species comprising a plurality of charged groups attached to the polymeric species, wherein the polyelectrolyte can adopt a contracted, coiled conformation or an extended, uncoiled conformation, depending on the ionic strength of the surrounding medium (e.g., fluid). In some cases, the polyelectrolyte comprises polymer chains having one or more charged groups, such as N-methyl pyridine, for example.

For example, in one set of embodiments, the block copolymer comprises a first block including a gel or polyelectrolyte, wherein the block is responsive to an altering stimulus. The block copolymer may further comprise a second block including a glassy material which is not responsive, or is responsive to a different or lesser extent, than the first block. Those of ordinary skill in the art would be able to select materials suitable for use as the first and second blocks of the block copolymer, in combination with a particular altering stimulus, to produce a photonic crystal having the desired properties in the presence/absence of the altering stimulus.

As described herein, some embodiments of the invention are capable of undergoing a change in dielectric constant or electromagnetic radiation-affecting dimension, upon exposure to a stimulus, without the need for addition of an agent to enhance the dimension-changing ability of the photonic crystal. For example, some embodiments of the invention comprise a composition comprising a block copolymer, as described herein, such that the photonic crystal is capable of, in the presence of an altering stimulus, undergoing a change in dielectric constant or an electromagnetic radiation-affecting dimension in the absence of an agent (e.g., a hydrogen-bonding agent such as a surfactant) associated with the block copolymer. In some embodiments the composition consists essentially of a block copolymer. In these embodiments, the composition is free of auxiliary species (e.g., agents) that would have a material effect on the response of the composition, in terms of interaction with electromagnetic radiation and/or in response to an altering stimulus. That is, the composition is free of an agent or agents which, if present, cause the composition to exhibit a particular behavior or response under set conditions in the presence of a stimulus but, under those same conditions in the presence of the same stimulus but in the absence of the agent or agents, behaves in a materially different way. "Materially different," in this context, typically would involve a diffracted wavelength of electromagnetic radiation changing by at least 10% or greater, as described herein, at a set point of observation relative to the photonic crystal, due to a change in an electromagnetic-affecting dimension of the photonic crystal. In some cases, "materially different" may involve a diffracted wavelength of electromagnetic radiation changing by at least 45% or greater.

For example, upon exposure to an altering stimulus, the photonic crystal, or portions thereof, may undergo a change in dielectric constant and/or electromagnetic radiation-affecting dimension in the absence of a hydrogen-bonding agent, including surfactants such as 3-n-pentadecylphenol.

In an illustrative embodiment, FIG. 1 shows, schematically, a photonic crystal comprising a block copolymer lamellar stack, wherein non-swellable, hydrophobic, glassy block layers (PS) are arranged in an alternating fashion with swellable, hydrophilic, polyelectrolyte block gel layers (QP2VP). Exposure of the photonic crystal to, for example, an aqueous solvent can result in an increase in both the polyelectrolyte block domain spacing and the refractive index contrast, accompanied by strong reflectivity and a shift of the stop-band position to longer wavelengths. In this type of arrangement, the hydrophobic and glassy PS layers can limit expansion of the gel layers to the direction normal to the layers. The change in domain spacing may be modulated by, for example, varying the salt concentration of the aqueous solvent.

In another set of embodiments, the polymeric article may comprise a multi-layer stack of alternating domains (e.g., layers) of a polymeric material and a separator material such as an inorganic material (e.g., ceramic, metal, semiconductor, etc.) or other polymeric material. The polymeric material and separator material may define domains in a periodic structure as described herein, wherein the polymeric material and separator material each have different dielectric constants (e.g., the dielectric constant ratio is not equal to 1.0). The polymeric material may comprise a gel or polyelectrolyte, and may be capable of undergoing a dimensional change as described herein, upon exposure to an altering stimulus.

In some cases, the photonic crystals may be selected to operate in the visible light spectrum (e.g., 300-700 nm). However, it should be understood that the photonic crystals may be designed and fabricated to be useful over a wide range of wavelengths. In some embodiments, the photonic crystals may be useful in the range of from about 200-1600 nm.

The present invention also provides methods related to photonic crystals as described herein. The method may comprise providing a composition comprising a block copolymer, as described herein, and exposing the composition to an altering stimulus such that the dielectric constant and/or electromagnetic radiation-affecting dimension of at least one of the domains changes relative to that of the other, at a set point of observation relative to the crystal. The method may further comprise observing the change in the electromagnetic radiation-affecting dimension. In some cases, the composition consists essentially of a block copolymer as described herein.

In some embodiments, the act of observing comprises observing a diffracted wavelength of electromagnetic radiation change by at least 45% at a set point of observation relative to the composition. In some embodiments, the act of observing comprises observing a diffracted wavelength of electromagnetic radiation, having a diffracted wavelength greater than 700 nm, change by at least 10 nm at a set point of observation relative to the composition. Some embodiments may comprise observing additional changes in the diffracted wavelength of electromagnetic radiation, as described herein.

As used herein, "observing" the change in the electromagnetic radiation-affecting dimension may comprise observing the change by sight, for example, by observing a colorimetric change, and/or determining the change. As used herein, the term "determination" or "determining" generally refers to the analysis of a species or signal, for example, quantitatively or qualitatively, and/or the detection of the presence or absence of the species or signals. "Determination" or "determining" may also refer to the analysis of an interaction between two or more species or signals, for example, quantitatively or qualitatively, and/or by detecting the presence or absence of the interaction.

The photonic crystals described herein may be selected to suit a particular application and may be prepared by various known methods. In some cases, the photonic crystal may be fabricated by providing materials having different dielectric constants and/or swelling ability and assembling the materials to form a periodic structure. For example, the photonic crystal may comprise a periodic arrangement of at least two different materials, including a polymeric material and a separator material, as described herein. Alternating films of the polymeric material and separator material may be formed on a substrate to produce a multi-layer stack having a periodic structure. In some cases, the photonic crystal may be fabricated by providing a block copolymer and allowing the block copolymer to self-assemble into a particular morphology, such a lamellar morphology.

The dielectric constants and/or refractive indices of separate domains of the polymeric articles, and periodicity in structural arrangement, can be tailored to meet desired criteria. The periodicity in structural arrangement may be met by creating separate domains of size that approximates the wavelength (in the material) of electromagnetic radiation desirably reflected by the photonic crystal, in some cases, domains of size no greater than the wavelength of interest. The dielectric constants and/or refractive index ratios between adjacent domains should be high enough to establish a stop band in the material. Stop band can be discussed with reference to two related ratios, the dielectric constant ratio and refractive index ratio (n1/n2), where n1 is the index of refraction of a first domain and n2 is the index of refraction of a second domain. In general, the larger the refractive index ratio (refractive contrast) the larger the stop band and, in the present invention, stop band is tailored to be above a predetermined threshold and extends in one dimension for one-dimensional materials, two dimensions for two-dimensional materials, and three dimensions for three-dimensional materials.

The dependence of the affected electromagnetic radiation upon the level of exposure of the photonic crystal to an altering stimulus (e.g., change in temperature, change in pH, etc.) may be, in some cases, preserved at relatively low temperatures. For example, in some embodiments, the dependence of the affected electromagnetic radiation upon the level of exposure of the photonic crystal to an altering stimulus may be preserved below a temperature of about 20° C., about 10° C., about 0° C., about −10° C., about −25° C., about −50° C., about −100° C., about −200° C., or lower. I.e., at a temperature range below a particular threshold, where other systems might fail to function, the inventive system can serve as a temperature indicator, and exposing the photonic crystal to an altering stimulus changes the affect the crystal has on electromagnetic radiation, in a measurable manner consistent with the invention, below that threshold temperature in those embodiments.

In some embodiments, after exposing the photonic crystal to a predetermined temperature, the photonic crystal is irreversibly changed such that the electromagnetic radiation affected by the photonic crystal is no longer dependent upon the level of exposure of the photonic crystal to a particular altering stimulus (e.g., a temperature change, pH change, etc.). As one specific example, in some cases, the polymer and solvent phases may phase separate after exposing the photonic crystal to a predetermined temperature. In one set of embodiments, exposing the photonic crystal to a predetermined temperature may comprise heating the photonic crystal to and/or above a predetermined temperature and/or cooling the photonic crystal to and/or below a predetermined temperature. In some embodiments, the electromagnetic radiation affected by the photonic crystal may be no longer dependent upon the level of exposure of the photonic crystal to an altering stimulus after heating the photonic crystal to a temperature at and/or above about −200° C., about −100° C., about −50° C., about −30° C., about −15° C., about 0° C., about 10° C., about 20° C., about 30° C., about 40° C., about 50° C., about 75° C., about 100° C., about 150° C., about 200° C., or more. In some embodiments, the electromagnetic radiation affected by the photonic crystal may be no longer dependent upon the level of exposure of the photonic crystal to an altering stimulus after cooling the photonic crystal to a temperature at and/or below about 200° C., about 150° C., about 100° C., about 75° C., about 50° C., about 40° C., about 30° C., about 20° C., about 15° C., about 10° C., about 5° C., about 0° C., about −15° C., about −30° C., about −50° C., about −100° C., about −200° C. or less. Embodiments such as these may be useful, for example, in applications where it is desirable to determine whether a sensor (or the article to which it is attached) has been raised above and/or lowered below a predetermined temperature. As a specific example, in one set of embodiments an exemplary PS-P2VP polymer in 0.01 M acetic acid solution may irreversibly change colors at or above a temperature of about 40° C.

As described herein, photonic crystals of the invention may undergo a volumetric or dimensional change in response to an altering stimulus. The altering stimulus may be any source of external energy including temperature change, pH change, a fluid, electromagnetic radiation, electric field (e.g., voltage), magnetic field, a chemical agent (e.g., molecules, ionic species), or pressure, and can include shear. In some cases, the altering stimulus may comprise exposure to fluids having differing ionic strengths (e.g., salt concentration).

In some cases, the altering stimulus may comprise addition of one or more chemical agents to perform periodically oscillating chemical reactions or "clock reactions." The clock reaction may be a cyclic reaction involving a series of chemical transformations, which may be periodically cycled (e.g., may be autocatalytic). In some embodiments, as the clock reaction proceeds, one or more chemical species may be produced resulting in a periodic variation in, for example, ion concentration, electric potential, pH, or the like. Examples of clock reactions include, but are not limited to, the BZ reaction, the Briggs-Rauscher reaction, the Bray-Lubhafsky reaction, and the iodine clock reaction (also called the Landolt reaction). In an illustrative embodiment, a photonic crystal may be exposed to chemical agents associated with a particular clock reaction, wherein, as the clock reaction proceeds and various species of ions are periodically generated, the color of the photonic crystal may periodically change due to the variation in ion concentration/identity.

In some embodiments, the altering stimulus may comprise a change in temperature. The article may be able, in some cases, to interact with and affect incident electromagnetic radiation in a way that is dependent upon the level of the change in temperature. For example, a change in temperature may produce a shift in the peak of the diffracted wavelength of the incident electromagnetic radiation. In some embodiments, a change in temperature of 1° C. may produce a shift in the peak of the diffracted wavelength of at least about 0.5 nm, at least about 1.0 nm, at least about 1.5 nm, or at least about 3.0 nm. In some embodiments, the change in the diffracted wavelength per degree of temperature change may depend upon the concentration and/or type of solvent in the photonic crystal. In addition, in some embodiments, the change in the diffracted wavelength per degree of temperature change may depend upon the type of polymer and/or the method of fabricating the polymer in the photonic crystal. As a specific example, the temperature-related color change for an exemplary PS-P2VP photonic gel may be, in some cases, about 0.7 nm/° C. when immersed in a methanol solvent and about 1.5 nm/° C. when immersed in a 0.01 M acetic acid-water solution.

The systems and methods described herein may be useful as peak and/or minimum temperature sensors. When used as temperature sensors (e.g., temperature sensors comprising photonic crystals) their ability to affect electromagnetic radiation may be dependent upon the level of temperature change up to and/or above (and/or down to and/or below) a predetermined temperature. At and/or below a predetermined temperature, the wavelength of the electromagnetic radiation diffracted from the temperature sensor may be temperature dependent, and hence, indicative of the temperature of the temperature sensor. Once the temperature sensor is heated to and/or above a predetermined temperature (e.g., above about −200° C., about −100° C., about −50° C., about −30° C., about −15° C., about 0° C., about 10° C., about 20° C., about 30° C., about 40° C., about 50° C., about 75° C., about 100° C., about 150° C., about 200° C., or more), however, the wavelength of the radiation diffracted from the temperature sensor may no longer be temperature dependent. In some cases, after heating the temperature sensor above a predetermined temperature, the user may be able to determine, via the sensor, the predetermined temperature, and determine that the sensor has been raised above the predetermined temperature.

In some cases, the wavelength of the electromagnetic radiation diffracted from the temperature sensor may be temperature dependent at and/or above a predetermined temperature, but once the temperature sensor is cooled to and/or below the predetermined temperature (e.g., 200° C., about 150° C., about 100° C., about 75° C., about 50° C., about 40° C., about 30° C., about 20° C., about 10° C., about 5° C., about 0° C., about −15° C., about −30° C., about −50° C., about −100° C., about −200° C. or less), the wavelength of the diffracted radiation may no longer be temperature dependent. In some cases, after cooling the temperature sensor to and/or below a predetermined temperature, the user may be able to determine, via the sensor, the predetermined temperature, and determine that the sensor has been cooled below the predetermined temperature.

As a specific example of a peak temperature sensor, a sensor comprising a photonic crystal that irreversibly changes color (e.g., to a bright red color) at and/or above a predetermined temperature (e.g., 20° C.) may be attached to a poultry package. This sensor could be used, for example, to indicate (e.g., to a vendor, a consumer, etc.) that the poultry has been exposed to unacceptably high temperatures. The embodiments described herein may also be used as a minimum temperature sensor. For example, a sensor comprising a photonic crystal that irreversibly changes color (e.g., to a bright red color) at and/or below a predetermined temperature (e.g., 0° C.) may be attached to a bottle of aqueous solution. This sensor could be used, for example, to indicate that the solution was exposed to temperatures below the freezing point of the aqueous solvent.

As described herein, at least a portion of the photonic crystal may comprise a polymeric material. The polymeric materials can include, but are not limited to, homopolymers, copolymers, block copolymers, blends of homopolymers, blends of block copolymers, blends of homopolymers and block copolymers, and polymeric materials combined with additives such as dyes, inorganic species, and the like. In certain embodiments, the polymeric material may comprise mixtures of polymeric materials, or mixtures of polymeric materials and other, non-polymeric materials, and can include two or more distinct domains of different composition and/or physical, chemical, or dielectric properties.

In some embodiments, polymeric materials suitable for use in the present invention include those capable of self-assembly to form a periodic structure. For example, the polymeric material may be a block copolymer which may self-assemble to form a particular morphology, including lamellar, spherical, cylindrical, and the like. An example of a block copolymer may be polystyrene-polyvinyl pyridine.

In some cases, the polymeric material can include, in addition to a polymeric species, a solvent (e.g., a non-volatile solvent) in an amount useful in swelling one or both domains, e.g. mineral oil in a polybutadiene/styrene block polymer which will swell the polybutadiene domain. Any suitable solvent may be used such as, for example, aqueous solvents or organic solvents. In some embodiments, an acidic solvent may be used. In some cases, a non-acidic solvent may be used. Examples of solvents suitable for use in the invention include water; methanol; ethanol; benzene; acetone; isopropyl alcohol; ethylene glycol; glycerol; β-methylbutyric acid; α-ethylbutyric acid; 2,2,2-Trifluoroethanol; 1-butanol; 1,4 butanediol; chloroform; bromoethane; methylacetate; ethylacetate; dimethylformamide; 2-butanone; divinylbenzene; propylene glycol monomethyl ether acetate (PGMEA); aqueous acetic acid solutions, and the like. This can be used to control the size of one or more domains. The polymeric material can also include other polymeric or non-polymeric additives for modification of domain dimension, other physical or chemical properties, or processability. In addition, a suitable non-polymeric additive present in the polymeric article can also constitute a separate phase/domain within the periodic structure. For example, the size of separate polymeric domains can be controlled also via changing the volume fraction of the domain, for example by incorporation of auxiliary nanoparticles, auxiliary homopolymeric species, auxiliary monomeric or cross-linkable species that are polymerized, grafted, and/or cross-linked in situ, and the like. The additives described above may be useful in affecting the number/type of domains and/or domain dimension, but may not cause the photonic crystal to behave in a materially different way upon exposure to an altering stimulus.

The block polymers can exhibit one-, two-, and three-dimensionally periodic structures arranged into separate domains within the structure with different domains characterized by a different chemical composition and/or set of physical properties. As used herein, a "periodic structure" refers to a structure arranged so that a straight line in at least one direction which passes through the structure intersects at regular intervals at least two separate domains. For example, a "one-dimensionally" periodic structure refers to a structure which can be oriented in a three dimensional coordinate system (with mutually orthogonal X, Y, and Z component directions) so that a straight line in only one component direction will pass through the structure and intersect at regular intervals at least two separate domains. A "two-dimensionally" periodic structure refers to a structure which can be oriented in the three dimensional coordinate system so that straight lines in only two component directions will passes through the structure and intersect at regular intervals at least two separate domains. Finally, a "three-dimensionally" periodic structure refers to a structure which can be oriented in the three dimensional coordinate system so that straight lines in all three component directions may pass through the structure and intersect at regular intervals at least two separate domains. Furthermore, the term "periodic structure" as used herein refers to material with domain structures having regular periodicity as characterized by like domains having similar characteristic dimensions and spacing within the article. The term "domain," as used herein, defines a distinct region of the structure characterized by a particular chemical composition and/or set of physical properties that differs from that of surrounding or adjacent domains.

A series of screening techniques can be used to select appropriate polymeric species for use in the invention, which include screening of constituent materials and process screening. The materials should be screened for the ability to form structures with desired characteristic domain dimensions and, where appropriate, periodic length scales. For embodiments using block polymers, this can be done by measuring the molecular weight of the block polymers using low angle laser light scattering (LALLS), size exclusion chromatography (SEC), nuclear magnetic resonance (NMR), mass spectrometry, membrane osmometry, and/or solution viscosity.

Planning and simple screening tests can be used to assess the relative compatibility of components including miscibility, phase separation, chemical stability, surface and interfacial energies, and processing stability in order to select suitable components for use as polymeric species, whether they be separate species, different blocks of a block polymeric species, or a combination. A first and second species should be comprised of components that are immiscible at an appropriate molecular weight and composition. The chi (χ) parameter, which is extensively tabulated for a wide range of polymers, can be used to predict miscibility. Once a particular set of species is selected, they can be mixed (if not defined by a block polymer) and screened for suitability for use in the invention by analysis via differential scanning calorimetry (DSC). If two glass transition temperatures are observed, then the two species (or two blocks of a block polymer) are immiscible, that is, the desired phase separation has taken place. If only one glass transition temperature is observed, then the components are miscible and phase separation has not occurred, or the glass transition temperatures of the differing species or blocks are coincidentally similar. For the latter situation, if one glass transition temperature is observed, another screening test involving small angle scattering measurements, or Transmission Electron Microscopy (TEM) can determine whether phase separation has occurred. Melt temperature and the existence of crystallinity are readily determined by thermal analysis techniques such as DSC or Differential Thermal Analysis (DTA).

Processing methods should also be screened for suitability with desired materials. For example, processing temperatures should be below degradation temperatures. Also, the types and magnitude of any physical forces applied during processing should be conducive to successful assembly of periodically ordered systems, and thus should be able to guide one or more assembly/partitioning events, which give rise to separate domains and a proper assembly of the domains into the periodic structure. Processing methods should be avoided that lead to the proliferation of undesired imperfections or that induce undesired chemical or physical damage to the materials or structure. The formation of a periodic structure possessing suitable characteristic domain dimensions and periodic length and composition can be verified by small angle x-ray measurements (SAXS), SEM, TEM, optical microscopy, and atomic force microscopy (AFM). These methods can also be used to inventory imperfections in the structure.

As mentioned above, a variety of polymeric species, including combinations of polymeric species, can be used to create the periodic structures of the invention. Where block polymers are used, they can be linear block polymers, "comb" block polymers, star block polymers, radial teleblock polymers, dendrimers, or a combination. Those of ordinary skill in the art can select suitable polymers or combinations of polymers to create the phase-separated structure of the invention.

In some embodiments, at least a portion of the photonic crystal may be capable of forming a gel or polyelectrolyte. As used herein, the term "gel" is given its ordinary meaning in the art and refers to polymer chains that may be cross-linked to form a network, wherein the network may be able to trap and contain fluids. Depending on the level of cross-linking, various properties of a particular gel can be tailored.

For example, a highly crosslinked gel may generally be structurally strong and may resist releasing fluid under pressure, but may exhibit slow transition times, while a lightly crosslinked gel may be weak structurally, but may react quickly during its phase transition. In the design of gels for a particular application, the degree of crosslinking may be adjusted to achieve the desired compromise between speed of absorption and level of structural integrity. Those of ordinary skill in the art would be able to identify methods for modulating the degree of crosslinking in such gels.

In some embodiments, the gel may be a hydrogel, including a crosslinkable hydrogel. The term "hydrogel" refers to water-soluble polymer chains that are crosslinked in the presence of water to form a network. Examples of polymers capable of forming hydrogels include, silicon-containing polymers, polyacrylamides, crosslinked polymers (e.g., polyethylene oxide, polyAMPS and polyvinylpyrrolidone), polyvinyl alcohol, acrylate polymers (e.g., sodium polyacrylate), and copolymers with an abundance of hydrophilic groups. In some embodiments, the gel may be a sol-gel. A "sol-gel" refers to a colloidal suspension capable of being gelled to form a solid. In some cases, the sol-gel may be formed from a mixture of solid particles (e.g., inorganic salts) suspended in a liquid, wherein a series of reactions including hydrolysis and polymerization reactions may be performed to form a colloidal suspension.

In some cases, the gel may be an organogel, wherein the polymer may be swollen by addition of an organic solvent.

Certain types of polymers are known to form crosslinking bonds under appropriate conditions. Non-limiting examples of crosslinkable polymers include: polyvinyl alcohol, polyvinylbutryl, polyvinylpyridyl, polyvinyl pyrrolidone, polyvinyl acetate, acrylonitrile butadiene styrene (ABS), ethylene-propylene rubbers (EPDM), EPR, chlorinated polyethylene (CPE), ethelynebisacrylamide (EBA), acrylates (e.g., alkyl acrylates, glycol acrylates, polyglycol acrylates, ethylene ethyl acrylate (EEA)), hydrogenated nitrile butadiene rubber (HNBR), natural rubber, nitrile butadiene rubber (NBR), certain fluoropolymers, silicone rubber, polyisoprene, ethylene vinyl acetate (EVA), chlorosulfonyl rubber, flourinated poly(arylene ether) (FPAE), polyether ketones, polysulfones, polyether imides, diepoxides, diisocyanates, diisothiocyanates, formaldehyde resins, amino resins, polyurethanes, unsaturated polyethers, polyglycol vinyl ethers, polyglycol divinyl ethers, polysaccharides, copolymers thereof, and those described in U.S. Pat. No. 6,183,901. In one set of embodiments, at least a portion of the polymeric structure may comprise polyvinyl pyridine or quaternized polyvinyl N-methyl-pyridine. Those of ordinary skill in the art can choose appropriate polymers that can be crosslinked, as well as suitable methods of crosslinking, based upon general knowledge of the art in combination with the description herein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

EXAMPLES

Polystyrene-b-poly(2-vinyl pyridine) (PS-b-P2VP) block copolymer with $M_n$=190 kg/mol-b-190 kg/mol (PDI=1.10) was purchased from Polymer Source Inc. (Doval, Canada). All other chemicals were purchased from Aldrich. FT-IR spectra of PS-b-QP2VP were obtained in the solid state in KBr pellets, using a Thermo Nicolet Nexus 870. UV-VIS-NIR spectra were obtained on a Varian Cary 6000i in transmission mode. SEM and ESEM images were obtained with a JEOL JSM 6060 and a Philips XL30 FEG ESEM respectively. TEM images were obtained on a JEOL 2010 operated at 200 kV. Laser scanning confocal micrography images were taken on a Leica TCS SP II equipped with an oil immersion objective lens (Leica, HCX PL APO 63×/1.40-0.60).

Example 1

The following example describes a general procedure for preparation of photonic gel films. Photonic gel films were prepared by creating well ordered PS/P2VP lamellar structures and then crosslinking/quaternizing the P2VP layers. First, a PS-b-P2VP ($M_n$=190 kg/mol-b-190 kg/mol) solution in propylene glycol monomethyl ether acetate (PGMEA) (5 wt %) was spun cast on to glass slides treated either with (3-aminopropyl)triethoxysilane or with (3-iodopropyl)-trimethoxysilane. The thickness of film was controlled to be approximately 1~3 µm. Well-ordered lamellar structures were formed by subsequently annealing the films in chloroform vapor at 50° C. for 24 hours. Next, P2VP layers were quaternized and crosslinked to various extents using various amounts of 1-bromoethane (BE) and 1,4-dibromobutane (DBB).

Figure 5:
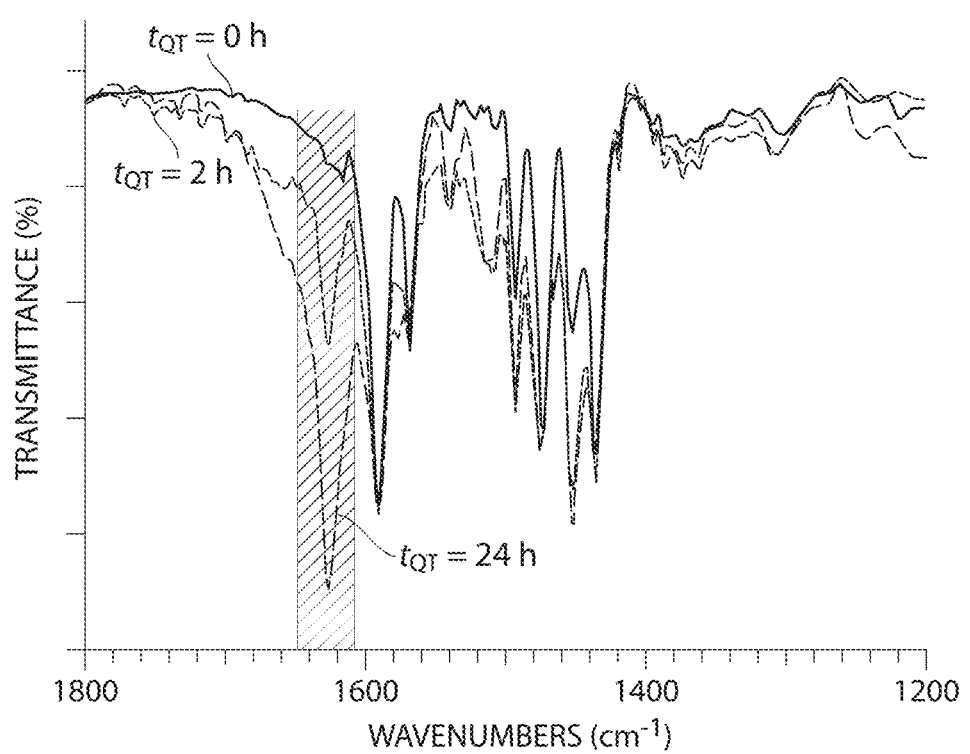
FIG. 5 shows FT-IR spectra of a PS-b-QP2VP film obtained after various quaternization times ($t_{QT}$).

A new quaternization-crosslinking method, in contrast to commonly used vapor methods, was developed. Quaternizing and crosslinking reactions were carried out by immersing the films in a mixture of BE, DBB and hexane at 50° C. for 24 hours. The reaction was monitored using FT-IR, and FIG. 5 shows FT-IR spectra of a PS-b-QP2VP film obtained after various quaternization times ($t_{QT}$). The characteristic pyridinium band at 1627 cm$^{-1}$ increased with increase of the reaction time. The spectrum obtained at $t_{QT}$=72 h was almost the same as that obtained at $t_{QT}$=24 h, which suggests that all pyridine groups can be converted to pyridinium groups after 24 h (or less) of reaction. The pyridine groups were converted to pyridinium groups by reacting with BE (quaternization) or DBB (quaternization and crosslinking). This process yielded approximately fully quaternized films with the extent of crosslinking variable by changing the mole fraction of DBB ($f_{DBB}$), while the total concentration of BE and DBB relative to hexane was kept as a constant at 10 vol %.

Example 2

The following example describes the use of various microscopy techniques to study the swelling behavior of photonic gel films.

Figure 2A:
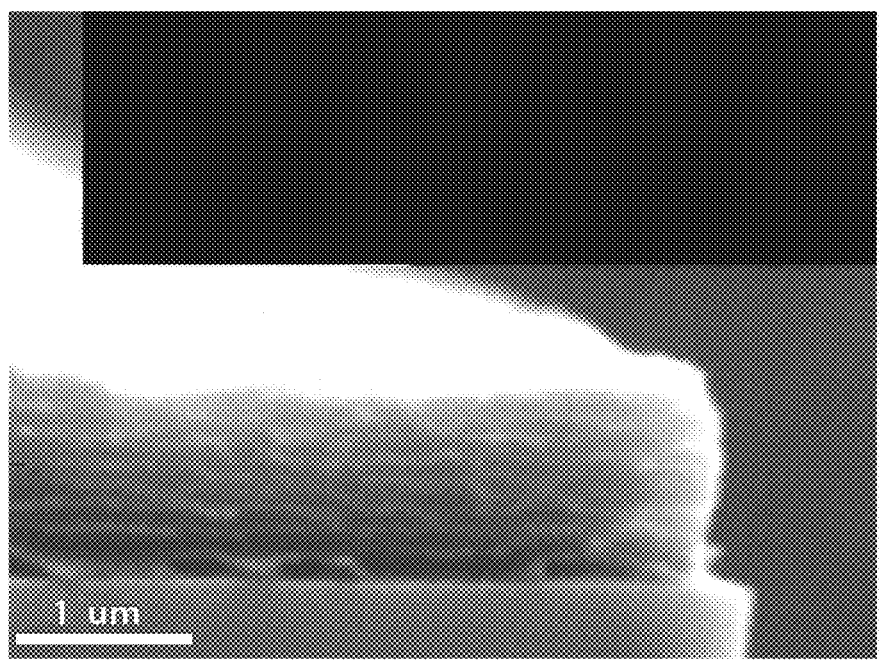
FIG. 2A shows an SEM micrograph of a dry PS-b-QP2VP lamellar photonic film deposited on a silicon wafer.
Figures 2B, 2C:
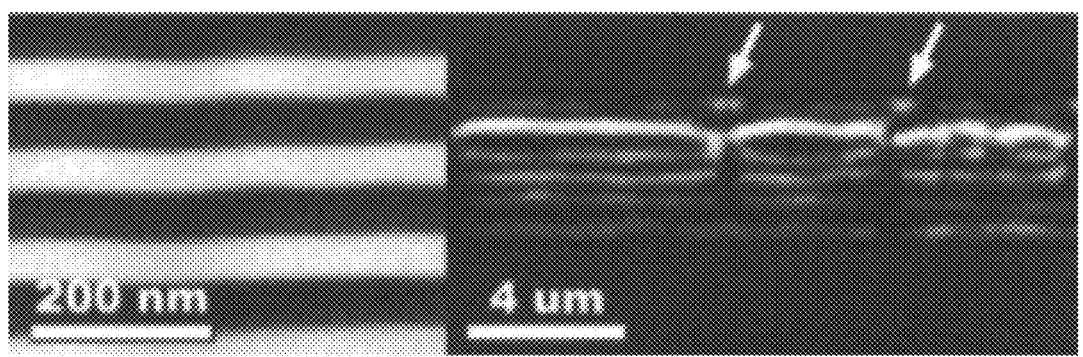
FIG. 2B is a TEM image of the dry PS-b-QP2VP lamellar photonic film stained with $I_2$ vapor, where the dark layers represent $I_2$-stained QP2VP domains.
FIG. 2C is a reflection mode LSCM image (xz-scan) of a swollen film PS-b-QP2VP lamellar photonic film deposited on a silicon wafer, showing defect channels across the layers.

Swelling of the film was imaged by environmental scanning electron microscopy (ESEM) and the swelling behavior was directly monitored as a function of humidity. Representative SEM and TEM images of dry photonic gels that were taken after fifteen swelling/de-swelling cycles. The sample was prepared by fracturing after freezing in liquid nitrogen. FIG. 2A shows an SEM micrograph of a dry PS-b-QP2VP lamellar photonic film deposited on a silicon wafer, FIG. 2B shows a TEM image of the dry PS-b-QP2VP lamellar photonic film stained with $I_2$ vapor, where the dark layers represent $I_2$-stained QP2VP domains, and FIG. 2C shows a reflection mode laser scanning confocal microscopy (LSCM) image (xz-scan) of a swollen film PS-b-QP2VP lamellar photonic film deposited on a silicon wafer, showing defect channels across the layers. The well-ordered structure with the layers parallel to the substrate had a microdomain periodicity of 100 nm with approximately equal thickness layers ($t_{PS}$=$t_{PS}$=50 nm). The dry thickness of the BCP films was typically 1-3 µm, indicating that the films contained 10-30 periods.

Figure 2D:
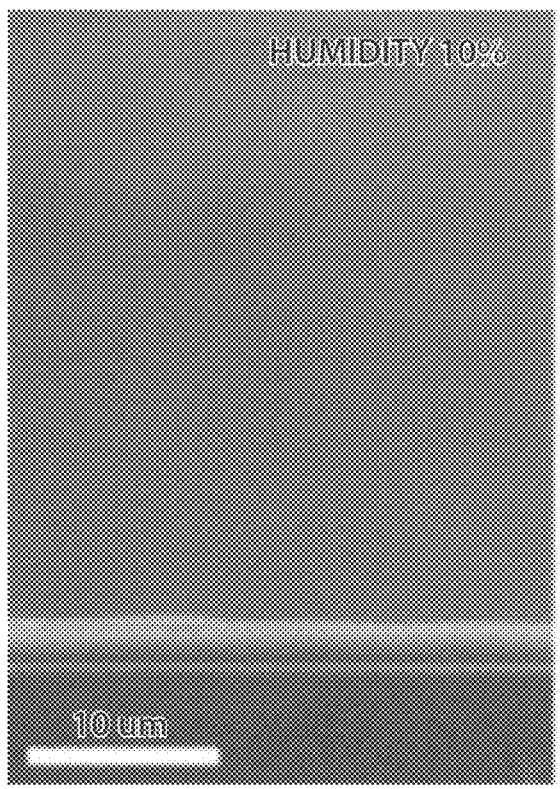
FIG. 2D shows an ESEM micrograph of a fully quaternized PS-b-QP2VP lamellar photonic film at 10% humidity level.
Figure 2E:
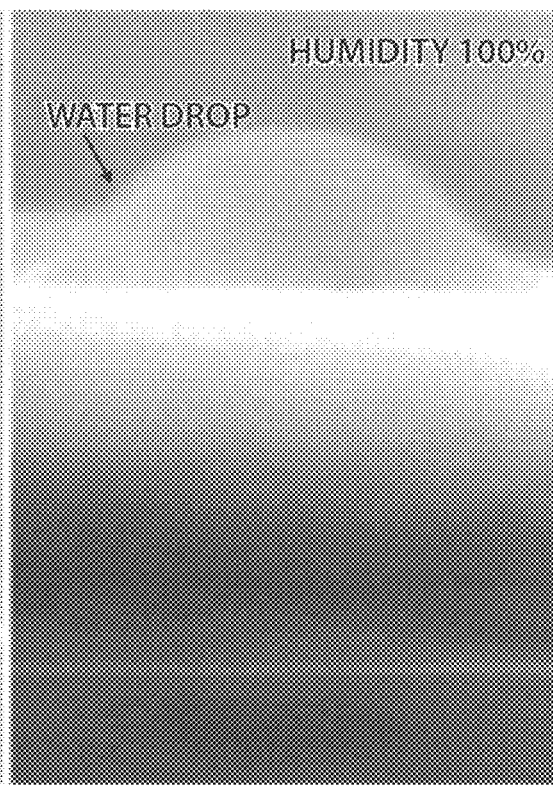
FIG. 2E shows an ESEM micrograph of a fully quaternized PS-b-QP2VP lamellar photonic film at 100% humidity level.

FIG. 2D shows an ESEM micrograph of a fully quaternized PS-b-QP2VP lamellar photonic film at 10% humidity level. FIG. 2E shows an ESEM micrograph of a fully quaternized PS-b-QP2VP lamellar photonic film at 100% humidity level. The initial film thickness was measured to be 2.9 pm at 0% and 10% relative humidity, and 18.6 pm at 100% relative humidity. For maximum swelling, a fully quaternized sample with no crosslinking (mole fraction of DBB ($f_{DBB}$=0) was employed. For 0–60% humidity, no significant thickness change was observed, however, above 70%, the film thickness increased with increasing humidity indicative of deliquescent behavior with the fully swollen film thickness at 100% humidity reaching 18.6 µm. LSCM showed many pores running perpendicular to the layers, as shown in FIGS. 2A-2C.

Figure 6A:
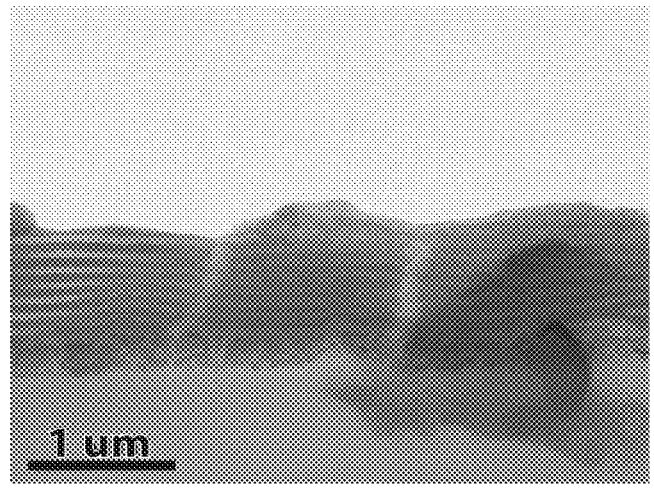
FIG. 6A shows a cross sectional TEM micrograph of vertically oriented defect pores in a dry PS-b-QP2VP ($M_n \times 10^3=190/190$) photonic film spun onto an epoxy substrate and stained with $I_2$ vapor showing the PS (light) and QP2VP (dark) layers.
Figure 6B:
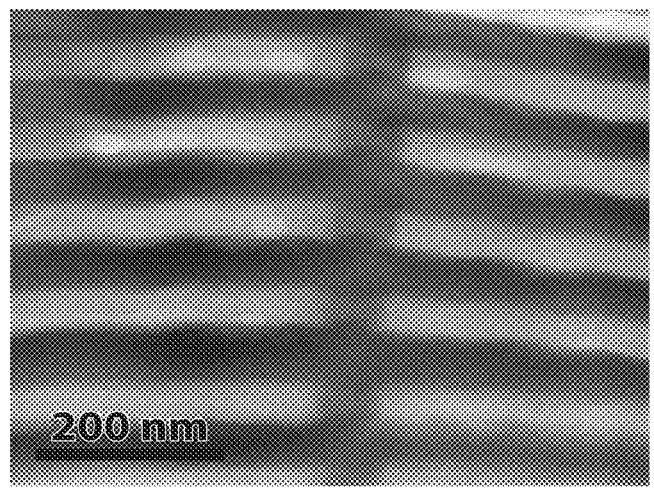
FIG. 6B shows a cross sectional TEM micrograph of helicoidal screw dislocations in a dry PS-b-QP2VP ($M_n \times 10^3=190/190$) photonic film spun onto an epoxy substrate and stained with $I_2$ vapor showing the PS (light) and QP2VP (dark) layers.

FIGS. 6A-6B show cross sectional TEM micrographs of the dry PS-b-QP2VP ($M_n \times 10^3$=190/190) photonic film spun onto an epoxy substrate and stained with $I_2$ vapor showing the PS (light) and QP2VP (dark) layers, where two types of defects are observed. FIG. 6A shows vertically oriented defect pores and FIG. 6B shows helicoidal screw dislocations having axes oriented along the layer normal. These features may aid in the rapid uptake and loss of fluids into/out of the lamellar structure.

The average thickness of a swollen QP2VP layer can be calculated based on the measured dry microdomain periodicities and the dry film thickness (2.9 µm). The calculated thickness of a fully swollen QP2VP gel layer was thus 590 nm, nearly 1200% of the original thickness, corresponding to over 5 times the rms end-to-end distance or about 60% of the fully extended end-to-end distance of a 190 kg/mol P2VP random coil in the melt state. This extremely large change in BCP microdomain period (d=100 to 640 nm) may lead to the large tunability of the stop-band.

Example 3

Figure 3A:
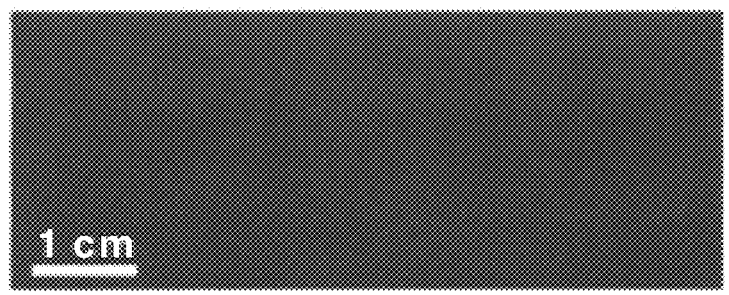
FIG. 3A shows a photograph of a dry photonic gel film in air.
Figure 3B:
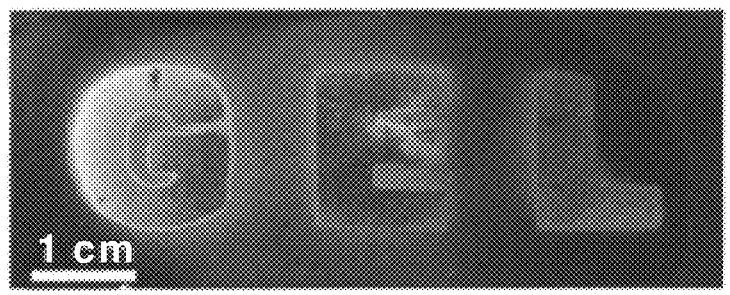
FIG. 3B shows the same photonic gel film as in FIG. 3A immersed in water.
Figure 3C:
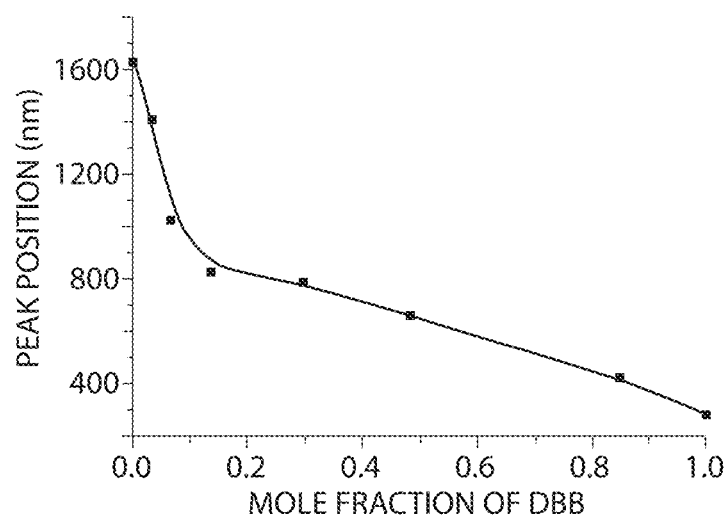
FIG. 3C shows the change of the primary stop band position as a function of DBB crosslinker.

The following example describes the effect of polymer crosslinking on the stop band position of the photonic crystal. FIGS. 3A-3B show photographs of (FIG. 3A) a dry photonic gel film in air and (FIG. 3B) the same photonic gel film immersed in water. The photographs were taken on the black background under fluorescent lights. FIG. 3C shows the change of the primary stop band position as a function of DBB crosslinker.

Figure 4A:
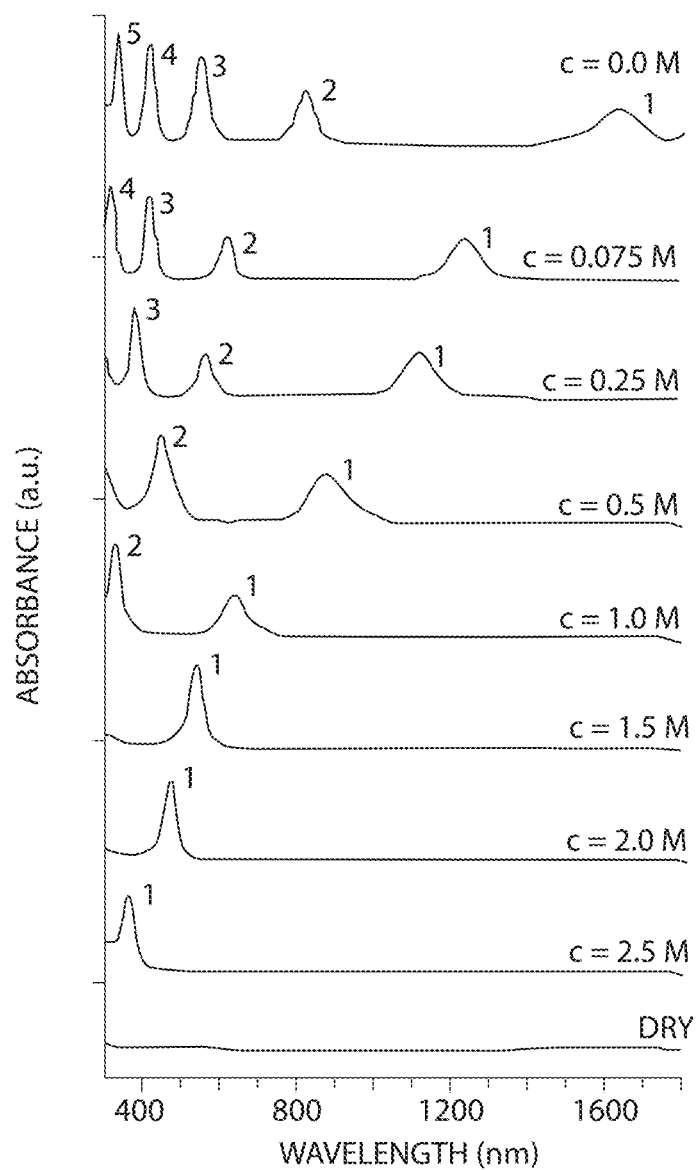
FIG. 4A shows the UV-VIS-NIR absorbance spectra of PS-b-QP2VP photonic gels swollen by contact with different concentrations of $NH_4Cl$ aqueous solution.

Since the domain spacing and the refractive index contrast ($n_{PS}=n_{P2VP}\approx1.6$) of dry photonic gel films were not sufficiently large to show a stop-band in the visible range of wavelengths, the original film is transparent to the eye (FIGS. 3C and 4A). Upon immersion in water the films immediately exhibited a color dependence based on the extent of crosslinking (FIGS. 3B-3C). For example, the film appeared blue ($\lambda_{peak}$=421 nm) at high crosslinking ($f_{DBB}$=0.85) and appeared red ($\lambda_{peak}$=658 nm) for decreased crosslinking ($f_{DBB}$=0.5). The largest stop-band was at 1627 nm when the film was fully quaternized and not crosslinked and the smallest stop-band was at 283 nm. (FIG. 3C)

Example 4

Multi-color patterns were made by sequential coating and crosslinking of films. As shown in FIG. 3B, a reflective film was first prepared by coating and quaternization with significant crosslinking ($f_{DBB}$=0.85), then the BCP solution was sprayed through a mask to locally build up a second layer of film to form the letters "GEL." This two layer film was crosslinked a second time but with $f_{DBB}$=0.5. Since the crosslinking density of the film regions forming the letters "GEL" was lower than that of the initial film, the pattern showed red letters on a blue background. On drying, the entire film became transparent, and the swelling/de-swelling cycle could be repeated >100× without any noticeable change in the optical properties.

Example 5

Figure 4B:
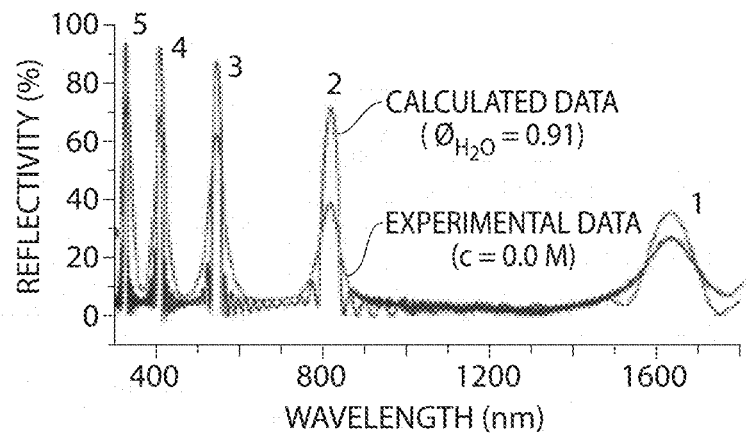
FIG. 4B shows a comparison between the experimentally-measured reflectance spectrum and a TTM-calculated reflectance spectrum (calculated at $\Phi_{H2O}=0.91$).
Figure 4C:
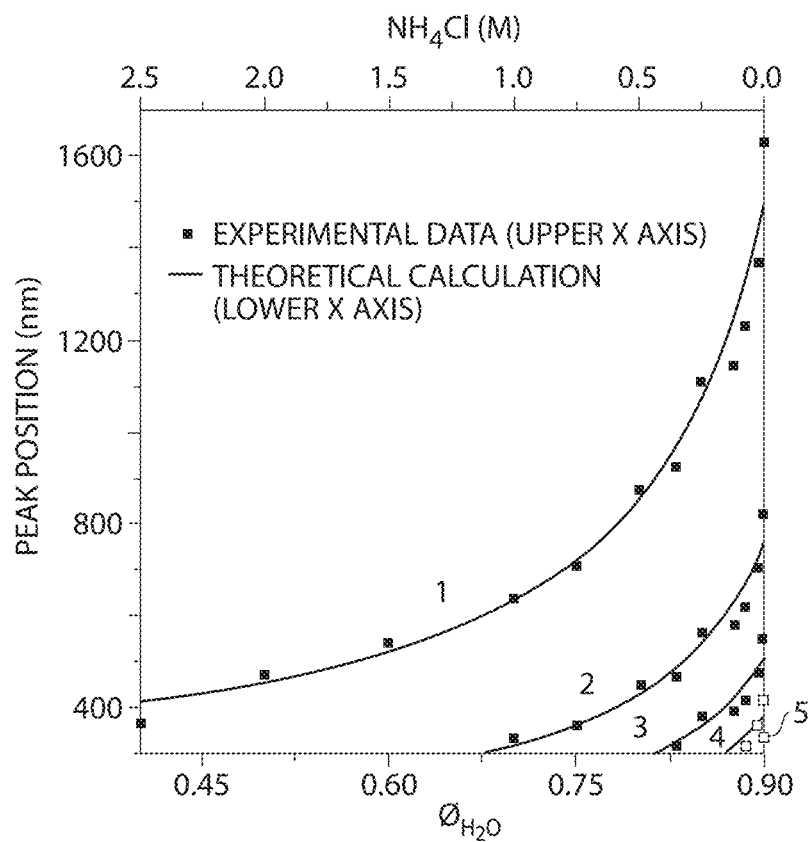
FIG. 4C shows a plot of the change of stop band position as a function of the $NH_4Cl$ concentration (dots) or vs. $\Phi_{H2O}$ (solid line) for each band.

In the following example, the properties of the photonic crystal were tuned by varying the salt concentration of a solution used to swell/de-swell the photonic crystal. FIG. 4A shows the UV-VIS-NIR absorbance spectra of PS-b-QP2VP photonic gels swollen by contact with different concentrations of $NH_4Cl$ aqueous solution. FIG. 4B shows a comparison between the experimentally-measured reflectance spectrum and a TMM-calculated reflectance spectrum (calculated at $\Phi_{H2O}$=0.91). FIG. 4C shows a plot of the change of stop band position as a function of the $NH_4Cl$ concentration (dots) or vs. $\Phi_{H2O}$ (solid line) for each band.

Swollen polyelectrolyte gels were made to collapse by osmotic de-swelling when placed in salt solution. FIG. 4A shows a series of UV-VIS-NIR absorbance spectra of a fully quaternized photonic gel film ($f_{DBB}$=0) in contact with a solvent reservoir at various $NH_4Cl$ concentrations. As the salt concentration in the reservoir decreases from 2.5 M to pure water, the primary stop-band position systematically shifted from 364 nm to 1627 nm.

Figure 7:
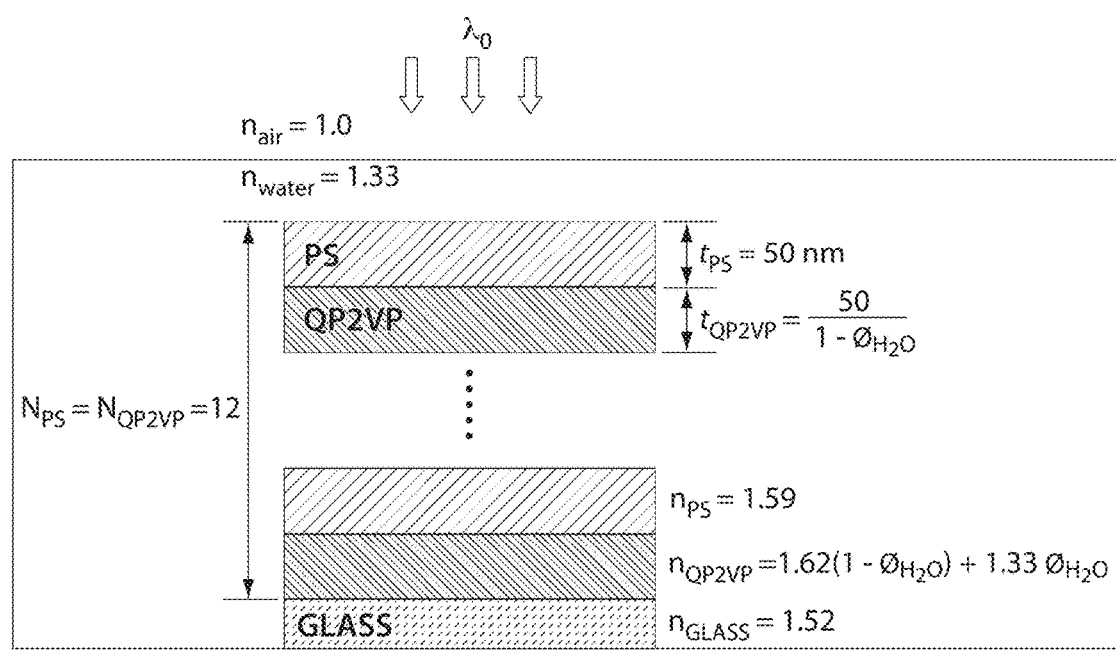
FIG. 7 shows parameters used for calculating the reflection spectra of photonic gel films by the transfer matrix model (TMM).

A 1D PC possesses a set of stop bands at frequencies $\omega_0$, $\omega_0/2$, $\omega_0/3$ etc. Normally, one employs the primary gap between the $1^{st}$ and $2^{nd}$ bands, but any of the higher order bands ($4^{th}$ to $5^{th}$ etc.) can be used to create a stop band at a specific frequency range by tailoring the domain periodicity and refractive index, provided the materials have appropriate index contrast and are low loss throughout the frequency region of interest. The fully quaternized but uncrosslinked photonic gel film exhibited from 1 to 5 well-defined reflectivity peaks simply by varying the concentration of the salt solution in contact with the film. Each reflectivity peak initially appeared in the UV region, then systematically moved towards longer wavelengths with an increase in osmotic swelling as the salt concentration of the reservoir was reduced. The transfer matrix method (TMM) was used to compute the theoretical spectra. For the TMM calculations, the lamellar structures are assumed parallel to the substrate with the QP2VP layers swollen by water having an index given by the volumetric rule of mixtures. FIG. 7 shows the parameters used for calculating the reflection spectra of photonic gel films by the transfer matrix model (TMM). The refractive index of QP2VP was scaled to a simple rule of mixtures based on water content of the QP2VP layers. The thickness of QP2VP was also scaled as a function of $\phi_{H_2O}$ based on the assumption of uniaxial expansion of layers by swelling.

In FIG. 4B, the calculated spectrum for $\Phi_{H2O}$=0.91 corresponded well to that of the fully swollen gel film in contact with a reservoir of pure water. All five bands were matched in position, relative intensity and band width versus water content (FIG. 4C). The experimentally measured band widths were slightly broader than those calculated ($\Delta FWHM$=10~20 nm), because of the defects and finite misorientation in the layers and limited collimation of the incident beam.

Example 6

The following example describes incorporation of a photonic crystal of the invention within an electrochemical cell, wherein the photonic crystal is exposed to an electric field.

A polystyrene-poly 2-vinylpyridine (PS-P2VP) block copolymer with a number average molecular weight of 57 k PS-57 k P2VP grams/mol was used as received from Polymer Source, Inc. (Doval, Canada). With the exception of 3-iodopropyl trimethoxysilane (IPS) which was purchased from Aldrich (Milwaukee, Wis.), all other chemicals were purchased from Alfa Aesar (Ward Hill, Mass.). Indium-tin oxide coated slide glass with a resistivity of 30-60Ω/□ was purchased from Delta Technologies (Stillwater, Minn.). The 198 μm ACLAR® fluoropolymer film spacer material was purchased from Structure Probe Incorporated (West Chester, Pa.). A Velleman PS613U 0-30 volt power supply was used to apply voltage to the device and a CARY 6000i UV-vis spectrophotometer was used to collect the transmitted spectra. TEM images were obtained from a JEOL 2010 at 200 keV.

Photonic films and devices were prepared according to the following general procedure. The PS-P2VP block copolymer was dissolved in propylene glycol monomethyl ether acetate (PGMEA) to make a 5% solution by weight. After dissolution, a 0.2 μm syringe filter was used to remove any contaminants and the solution was degassed in a vacuum oven prior to spin coating. ITO slides were first treated with IPS to ensure that the films did not delaminate from the substrate after immersion into liquid. An open vial of IPS was placed in a vacuum desiccator along with the upward facing ITO coated glass. Vacuum was applied for 10 minutes, the vacuum connection was closed and the samples were allowed to sit for 5 more minutes. The slides were then used for spin coating within the next 15 minutes. The 5% PS-P2VP solution was uniformly distributed across the surface of the treated slide and then spun at 500 rpm for 90 seconds. After spin coating samples were suspended above chloroform in a jar with a loose fitting lid which was then heated to 40° C. on a hotplate for at least 8 hours. Upon completing the chloroform vapor annealing treatment, samples were checked for the presence of well-aligned lamellar domains by TEM. Also, since, in the annealed film, PS and P2VP had almost matching refractive indices (~1.59) and the layer spacing was quite small, the annealed films were initially transparent. Alignment of the lamellar domains was also checked by spraying methanol onto the film surface to cause the P2VP to swell, producing a blue reflective film. This indicated the presence of well-aligned lamellar domains.

If needed, quaternization of the polymer was carried out by immersing the sample into a 10% by volume solution of bromoethane in hexane and heating the solution in a well sealed jar to 40° C. in an oven for several days (depending on the extent of quaternization required.)

Figure 8A:
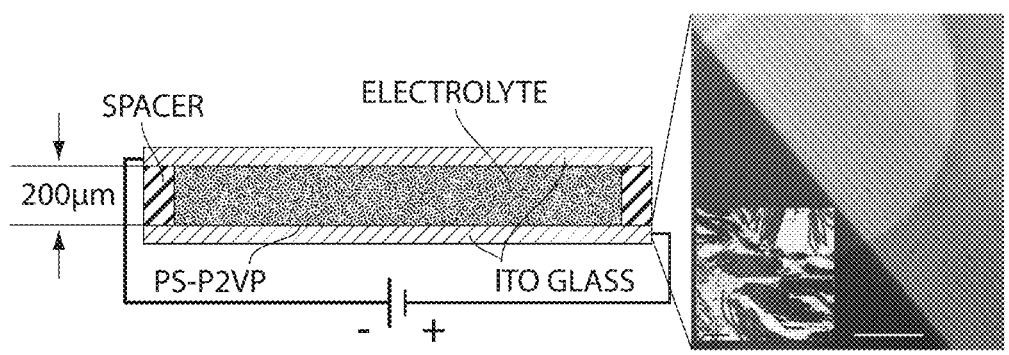
FIG. 8A shows an electrochemical cell comprising a photonic film, according to one embodiment of the invention.

The electrochemical cell was prepared as follows: The photonic film was immersed in a 0.01M acetic acid solution which caused the P2VP domains to swell due to partial protonation and the film became green in color. The electrochemical cell was completed by placing a polymeric spacer (a 200 µm ACLAR fluoropolymer spacer) on top of the film and sealing in the acetic acid solution. A second ITO slide was then placed on top of the polymeric spacer, to form an ITO/photonic film/polymeric spacer/ITO layered structure, as shown in FIG. 8A. An electrolyte was then introduced into the gap between the two slides and electrodes attached to the respective slides. The positive lead from the power supply was connected to the substrate containing the PS-P2VP and the ground lead was attached to the superstrate. When voltage was applied to the cell electrodes and the redox potential of water was reached, the following half-cell reactions were set up:

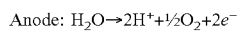
Anode: $H_2O \rightarrow 2H^+ + \frac{1}{2}O_2 + 2e^-$

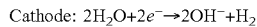
Cathode: $2H_2O + 2e^- \rightarrow 2OH^- + H_2$

The generation of H+ ions at the anode and OH− ions at the cathode changed the local pH of the solution. Ions in solution (H+, OH−, and acetate−) experienced diffusive (due to concentration gradients) and electrophoretic motion (due to the applied electric field). The production and motion of these various ions can be described by a differential equation and produced a constant pH gradient in the cell with the cathode becoming more basic and the anode more acidic.

Figure 8B:
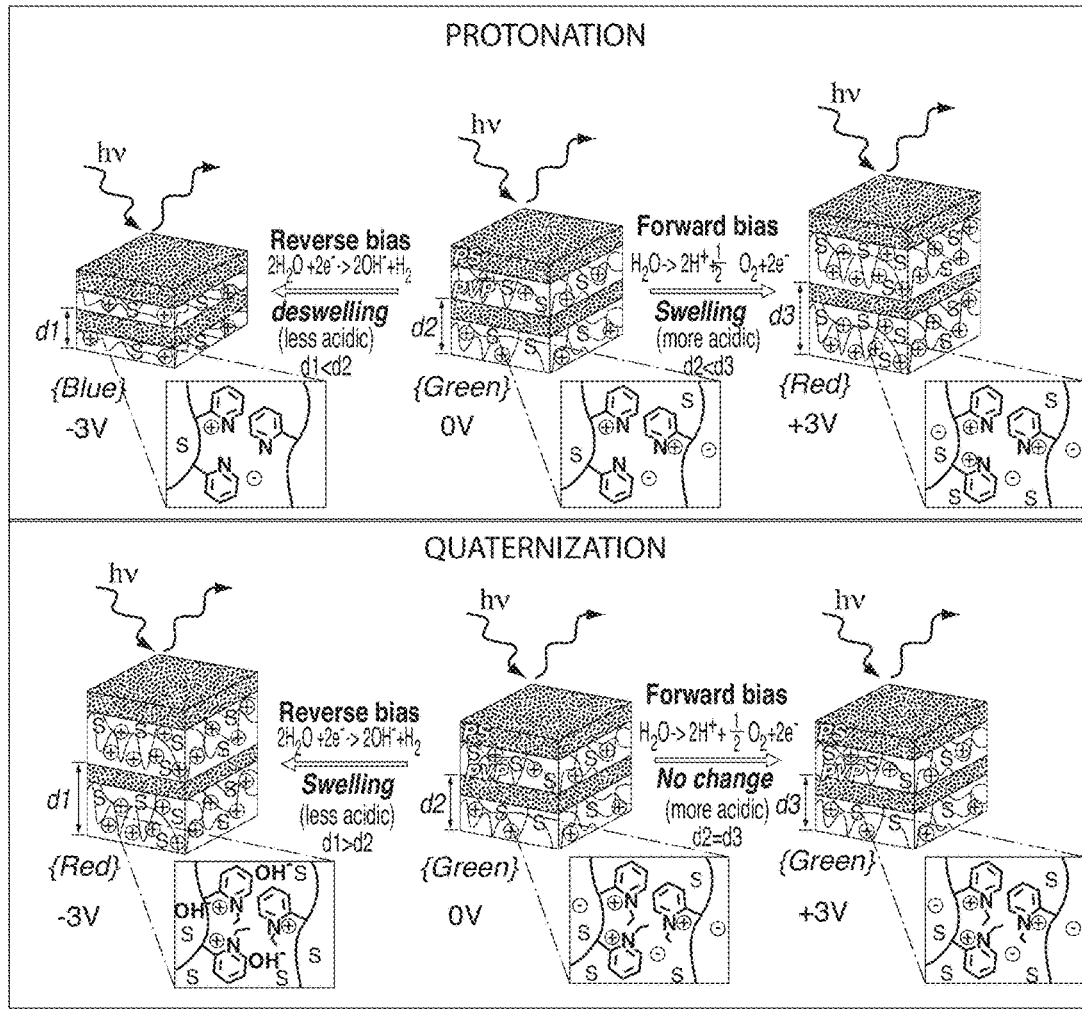
FIG. 8B shows, schematically, the behavior of a photonic film incorporated within an electrochemical cell upon exposure to various voltages.

Upon application of three volts (DC) the film responded to a pH gradient that was established in the cell and red-shifts from green to orange were observed, due to the increased protonation of the P2VP (FIG. 8B). If the voltage was increased the film continued to change color resulting in a red (~5V) and near infrared (NIR) reflecting film (~7V). In some cases, the near NIR performance was not maintained for very long due to instability of the electrochemical reduction of the ITO at higher voltages. By reversing the electrodes such that the anode (ground) was connected to the film, the swelling behavior was reversed. Applying three volts caused the gel to shrink and turn blue. As more voltage was applied, more hydroxide ions were produced. As the film become more deprotonated, collapsing of the gel and blue-shifting of the reflectivity peak were observed.

In order to make sure the color change was due to a pH gradient and not capacitive ion movement, Maxwell stress induced dimensional changes, or other non-electrochemical mechanisms, PS-P2VP was spun onto ITO glass that had been passivated by the deposition of poly cyclohexyl methacrylate-co-ethylene glycol diacrylate, forming an electron barrier layer. When voltage was applied to this film there was no response until relatively high voltages when the barrier layer broke down and pinholes were formed allowing electrochemistry to occur and change the color of the surrounding film.

Electrochemical tuning of quaternized PS-P2VP was also investigated. Quaternization of the P2VP domains was accomplished by immersing the processed and annealed films in a 10 vol % solution of bromoethane in hexane and heating to 40° C. for a period of time extending up to three days. A fully quaternized film produced a dark red reflection when immersed into water and a green color when immersed in ethanol. Device construction was the same as the protonated case with the exception that the electrolyte was ethanol with acetic acid (comparable in concentration to the protonated case.) When a positive voltage was applied to the anode there was no color change due to the fact that all available pyridine groups in the P2VP were quaternized and no further protonation was possible. When the leads were reversed and a negative bias was applied to the film, the film expanded and turned red. Without wishing to be bound by theory, this behavior may be attributed to the difference in swelling caused by the replacement of the acetate counter ions normally associated with the pyridinium groups with hydroxide counter ions. The hydroxide counter ions, being more hydrophilic, may allow the gel to swell to a greater degree and thus produce a red shift in the reflected spectra.

The PS-P2VP system has been shown to be tuned by external stimuli to produce rapid changes in reflected wavelengths. The thin form factor, low turn-on voltage, high reflectivity, and fast switching speeds may be useful in applications such as static and dynamic displays, active camouflage elements, and with suitable choice of molecular weight, signaling devices in other wavelength ranges.

Example 7

The following example describes the thermochromic behavior (i.e., change in color as a function of temperature) of a photonic gel block co-polymer in selective solvents. The specific system under investigation was a symmetric poly (styrene)-poly(2-vinylpyridine) (PS-P2VP) block co-polymer with a molecular weight of 57 kg/mol (PS)-57 kg/mol (P2VP) and a polydispersity of 1.08, purchased from Polymer Source (Duvall, Canada). Samples were spun onto slide glass and were immersed in several different liquids and cooled to a temperature just above their freezing points. In order for the PS-P2VP to reflect visible light, it was immersed in a solvent and one or both domains swelled depending on the affinity of the solvent to the polymers that constituted the block copolymer. In the present case, the solvents for the P2VP block included methanol, acetic acid, and deionized water. These solvents did not swell the PS block, which remained rigid and glassy. The temperature-related behavior in a selective solvent was probed from 1° C. to 23° C. for a quaternized PS-P2VP sample in de-ionized water and for PS-P2VP samples immersed in 1M, 0.1M, and 0.01M acetic acid. The temperature-dependence of the reflectivity peak was also explored from −17° C. to 41° C. in PS-P2VP samples immersed in methanol. Transmission spectra were collected on a CARY 6000i UV-vis spectrophotometer using a purpose-built liquid cell with a volume of approximately 100 cm³. Experiments were run by filling the chamber with the desired liquid and then quickly transferring the PS-P2VP sample (on a glass slide) into the holder. Samples were soaked in the measurement liquid for at least one hour prior to the experiments to allow the sample to equilibrate at room temperature. The front glass plate was 1.5" wide by 3" tall. Three different sample sets were investigated to elucidate the thermochromic behavior in the PS-P2VP system: methanol swollen PS-P2VP, acetic acid-water swollen PS-P2VP, and de-ionized water swollen PS-quaternized P2VP.

Although all samples were produced using the same block copolymer, choices in solvent and processing conditions (e.g., quaternization) had large effects on the thermochromic behavior of the photonic gel polymer.

Figure 9:
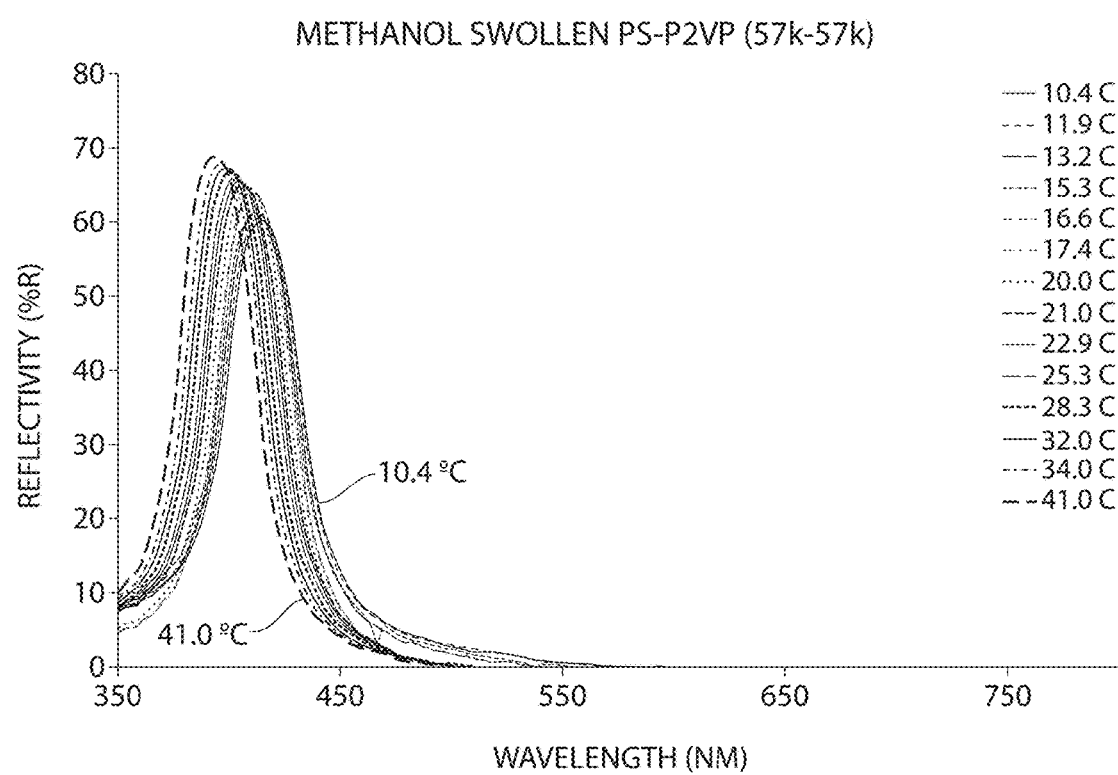
FIG. 9 includes a plot of reflectivity as a function of wavelength with methanol as the solvent, according to one set of embodiments.
Figure 10:
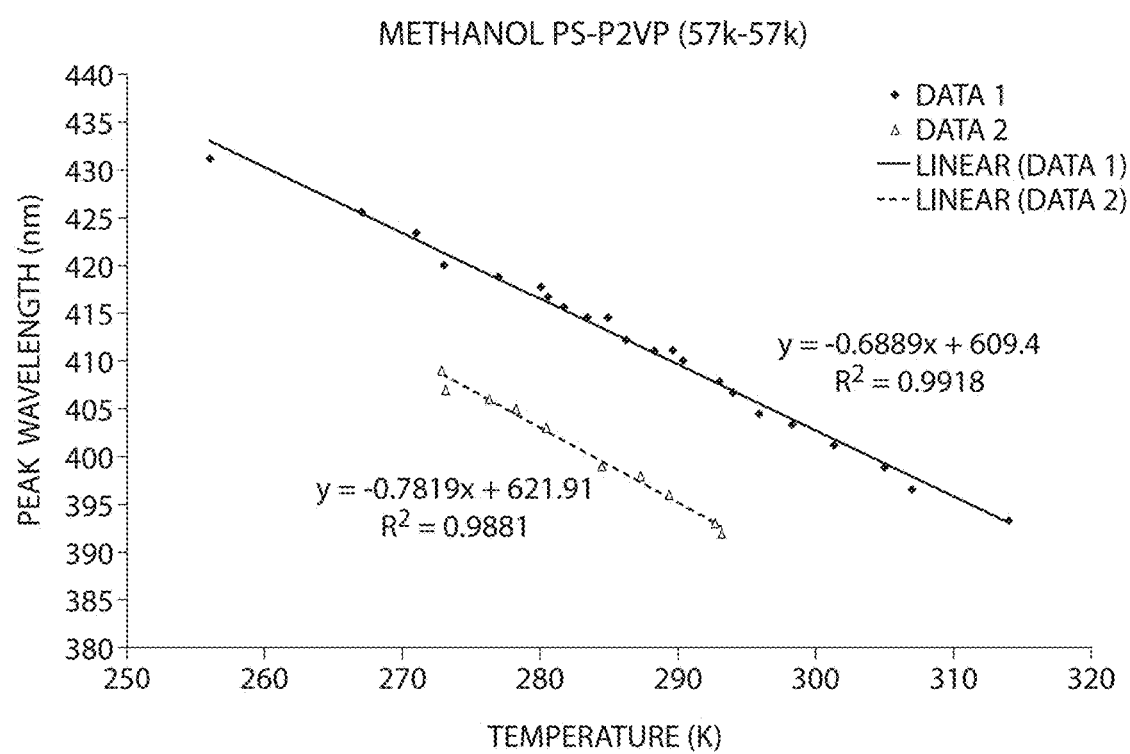
FIG. 10 includes a plot of peak wavelength as a function of temperature with methanol as the solvent, according to one set of embodiments.

First, the performance of the photonic gel in methanol was investigated. The 57 k-57 k PS-P2VP samples were immersed in a liquid cell filled with methanol (99.9+% from Alfa Aesar). Upon immersion the P2VP domains absorbed the methanol, swelling to approximately 87% by volume methanol, while the PS domains remained unswollen. FIG. 9 illustrates a typical dataset for a methanol-swollen sample. As the temperature was lowered, longer wavelengths were reflected (red-shift) and as FIG. 9 shows, the process produced a linear change in wavelength for a given change in temperature. The P2VP expanded as the sample was cooled rather than contracting as one might expect from a thermal expansion driven change. Only peaks from 10-41° C. are included in FIG. 9 to preserve graphical clarity. Although fogging of the cell window was a problem at lower temperatures (−17° C. to ~5° C.), peak positions were still clearly evident. FIG. 10 also shows disparities between two samples, but while the peaks are shifted by 10 nm the slopes of the temperature-peak wavelength curves were quite close (−0.69 nm/° C. vs. −0.78 nm/° C.).

Not wishing to be bound by any theory, three factors may have influenced the temperature-related refractive-index changes of the methanol/P2VP layers: the change in index with temperature of P2VP ($dn_{P2VP}/dT$) and methanol ($dn_{MeOH}/dT$) and the change in the effective index due to the gain/loss of methanol when the layers swelled or shrank ($\Phi_{solvent/P2VP}$). The last parameter was found through modeling the 1D photonic crystal with a transfer matrix method calculation and (assuming a linear change in index with concentration of methanol) was found to be quite small (+1.15×10$^{-4}$/° C.). $dn_{P2VP}/dT$ could not be found in the literature, but was assumed to be similar to $dn_{PS}/dT$ which is −1.42×10$^{-4}$/° C. $dn_{MeOH}/dT$ was approximately three times as large (−4.7×10$^{-4}$/° C.) and since the P2VP/methanol layers were mostly methanol, it may have been the dominant effect. Combined, these three factors may have accounted for a reflectivity peak shift of −0.09 nm/° C. out of a total of −0.74 nm/° C. Hence, a majority of the temperature-related shift may have occurred through a change in spacing of the P2VP/methanol layers.

The thickness of the P2VP/methanol domains may have been controlled by the affinity of the methanol for the P2VP. The solubility parameters of the polymer ($\delta_{polymer}$) and the solvent ($\delta_{solvent}$) could give a measure of solvent quality. A loss of solvent affinity due to a change in temperature was usually indicated by an increasing difference between solubility parameters. The reduction in solubility with increasing temperature has been suggested as a reason why other gel systems such as poly(n-isopropylacrylimide) display lower critical solution temperature (LCST) behavior. In LCST systems, the polymer and solvent are miscible below the LCST and when the temperature is raised above the LCST, phase separation occurs. It has been shown experimentally that the solubility parameter of methanol changes with temperature at a rate of −0.0382 MPa$^{1/2}$/° C. (from 0 to 60° C.). Assuming that the percent change in the thickness of the swollen layers was equivalent to the percent change in solubility with temperature, a −0.44 nm/° C. peak shift could be attributed to solvation effects.

Similarly, a change in affinity between a polymer and a solvent may be measured by the change in the Flory-Huggins χ parameter which is related to the difference in solubility parameters. Although no report of χ P2VP-MeOH could be found, a literature report for the similar P2VP-ethanol system found a slight increase in χ with increasing temperature (0.43 at 20° C. to 0.44 at 40° C.). This increase in χ with temperature suggests that at higher temperatures, the ethanol has a lower affinity towards the P2VP, thus corroborating the argument regarding the solvation effect hypothesized above.

An alternative mechanism of solvent affinity change occurring in P2VP/methanol is the protonation of P2VP to P2VP+. There are a finite number of protonated P2VP monomers along the polymer backbone in a methanol solution due to the auto-dissociation of methanol (pKa 15.5) into H+ and methoxide ions (P2VP pKa ~4.5 yielding [P2VP]/[P2VP+]~1:200). This change from P2VP to P2VP+ may cause a large change in the solubility of P2VP chains in methanol as shown by the shift from blue to red when a PS-P2VP photonic crystal is immersed in methanol upon full protonation or quaternization of the P2VP. If the percentage of monomers that were protonated on the P2VP chains were to be affected by temperature, the amount of solvent in the gel would be affected and thus shift the reflectivity peak. This scenario was possible because of the temperature dependence of the pKa of P2VP. The link between solubility and pKa is explored in depth in relation to the acetic acid-water solvent tests described below.

Figure 11:
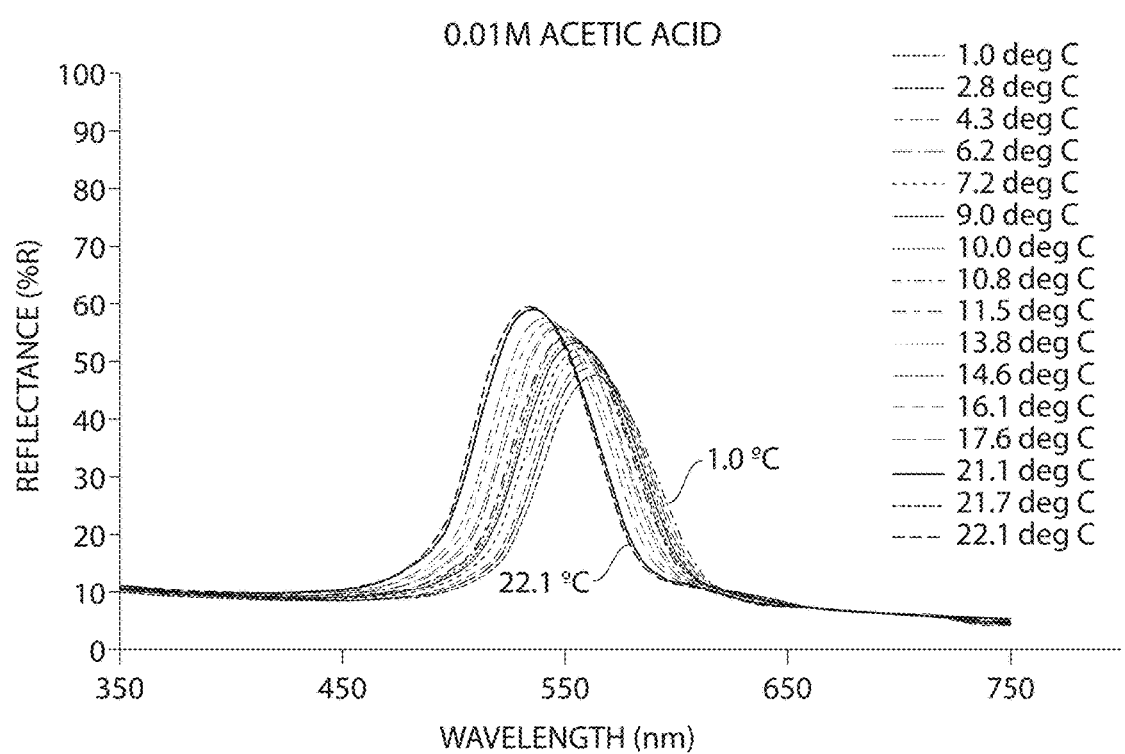
FIG. 11 includes a plot of reflectance as a function of wavelength with acetic acid as the solvent, according to one set of embodiments.
Figure 12:
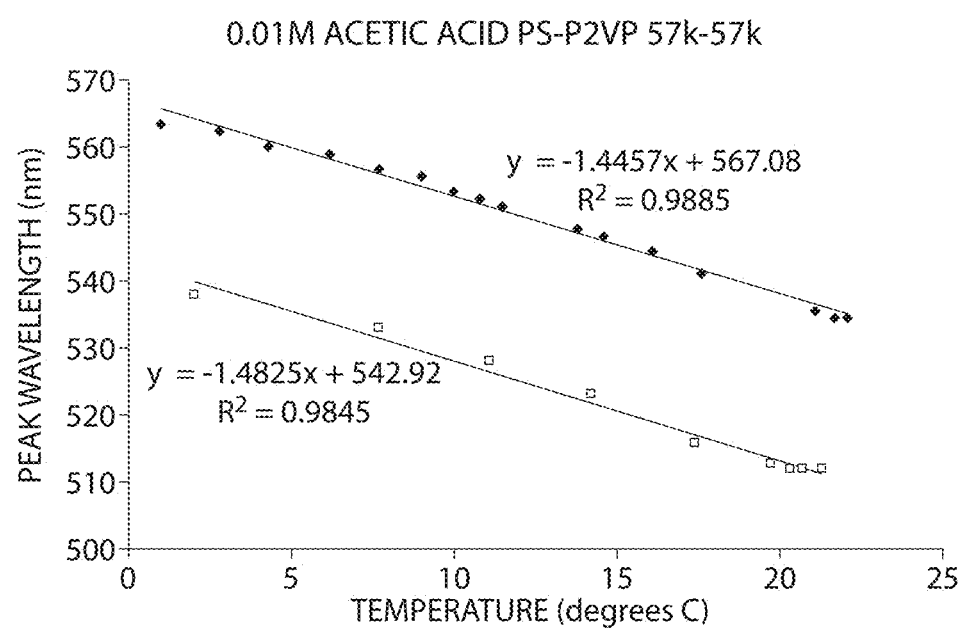
FIG. 12 includes a plot of peak wavelength as a function of temperature with acetic acid as the solvent, according to one set of embodiments.

The thermochromic behavior of the photonic gel block co-polymer in acetic acid-water solutions was also investigated. Acetic acid-water solutions swelled the PS-P2VP system to a differing degree depending on the pH of the solution. Not wishing to be bound by any theory, as the pH of the solution was decreased, the vinylpyridine may have become more protonated. This may have caused an increase in solubility and thus an uptake of solvent, swelling the P2VP layers. Three different acetic acid concentrations (0.01M, 0.1M, and 1.0M) were selected to test the reflectivity response when the P2VP blocks were protonated to different degrees. As with the methanol case, differences between samples with the same degree of protonation showed a shifting of the temperature-peak wavelength data, but the slopes of the curves were almost identical for all the data sets (−1.45 nm/° C. vs. −1.48 nm/° C. for the two data sets shown). Samples swollen with the 0.1M and 1M acetic acid solutions showed little change in reflectivity respectively over the temperature range of 1 to 20° C. FIG. 11 illustrates a typical dataset for a 0.01M acetic acid-swollen sample. As the temperature of the 0.01M acetic acid-water solution was decreased, the reflectivity shifted toward longer wavelengths. The increased intensity at shorter wavelengths may have been due to the change in index of refraction with wavelength, leading to a greater difference in index between the two layers and thus higher reflectivity. FIG. 12 includes a plot of peak wavelength as a function of temperature for two representative samples in 0.01M acetic acid. The linear change in peak wavelength with temperature of approximately 1.45 nm/° C. from 1 to 22 degrees Celsius is repeatable, although the precise position of the reflectivity peak depended upon sample preparation.

Figure 13A:
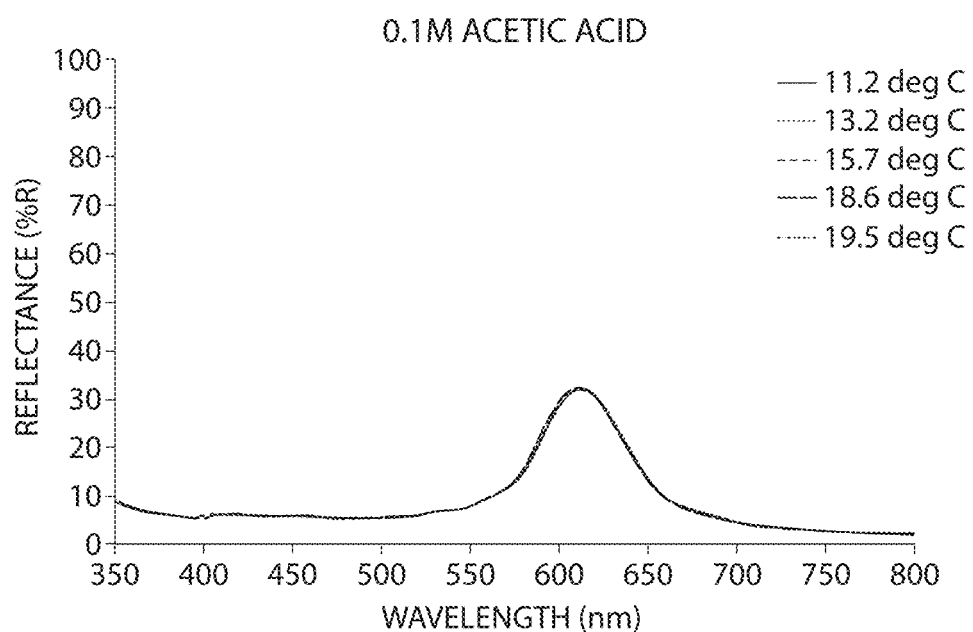
FIG. 13A is a plot of reflectance as a function of wavelength with acetic acid as the solvent, according to one set of embodiments.
Figure 13B:
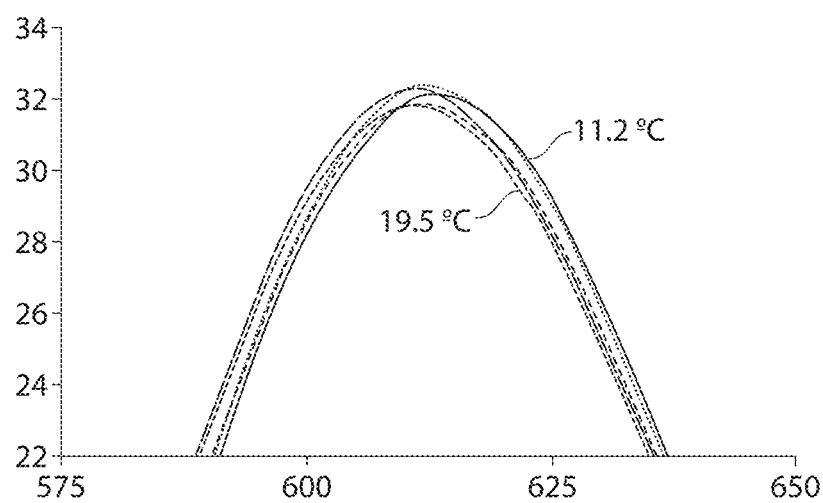
FIG. 13B is a plot of reflectance as a function of wavelength with acetic acid as the solvent, according to one set of embodiments.

FIGS. 13A-13B illustrate a typical dataset for a 0.1M acetic acid-swollen sample. As the temperature of the 0.1M acetic acid-water solution was decreased, there was little change in the reflected wavelengths of light. Not wishing to be bound by any theory, the P2VP layers may have been almost fully protonated and thus may not have changed their spacing with a change in temperature.

Figure 14A:
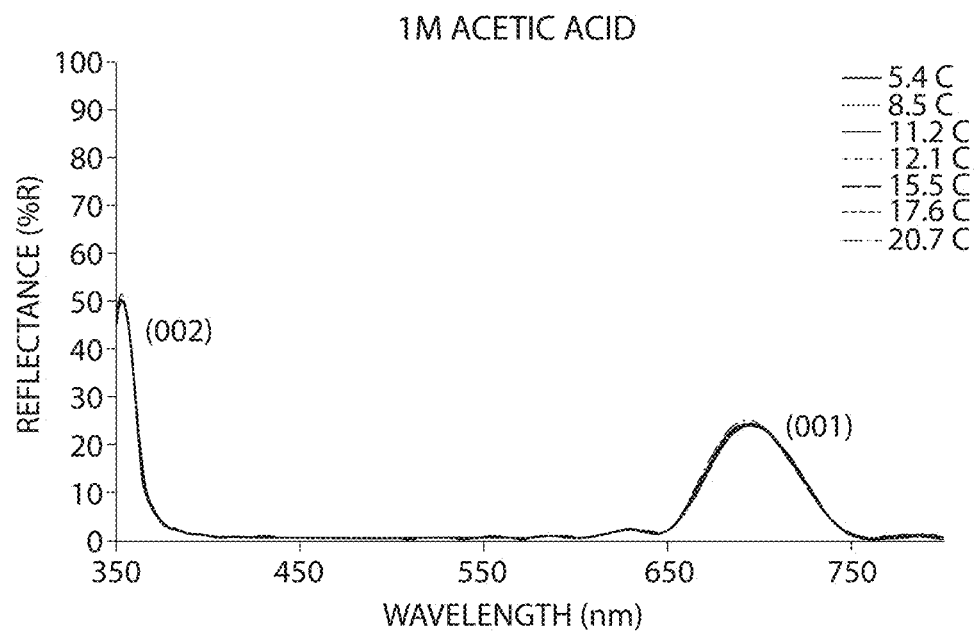
FIG. 14A is a plot of reflectance as a function of wavelength with acetic acid as the solvent, according to one set of embodiments.
Figure 14B:
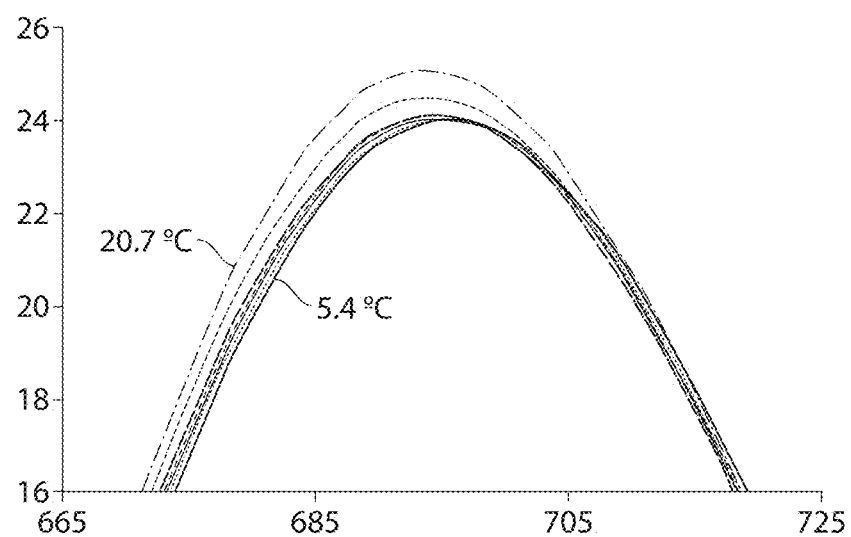
FIG. 14B is a plot of reflectance as a function of wavelength with acetic acid as the solvent, according to one set of embodiments.

FIGS. 14A-14B illustrate a typical dataset for a 1M acetic acid-swollen sample. As with the 0.1M acetic acid solutions, there was little change in the reflected wavelengths of light as the temperature of the 1M acetic acid-water solution was decreased. The sample may have been fully protonated. In such a case, the change in pKa of the P2VP would not have influenced the degree of protonation, and the sample would not have swelled with a decrease in temperature. The secondary reflection peak can be seen just above 350 nm. The (001) and (002) labels denote the first and second order reflectivity peaks respectively.

As discussed earlier, $\chi$ is a measure of the relative interaction strength between the two types of polymer segments in the BCP and could possibly play a role in the thickness of the P2VP domains. As the temperature increases, the entropy of mixing term ($-T\Delta S_{mix}$) in the free energy of mixing grows. As the term is negative, repulsion between the two polymers is reduced, reducing the domain size (assuming the chains of both blocks are mobile). The effect of temperature on $\chi$ in the poly(styrene)-poly(vinyl-methyl ether) system and the poly(styrene)-poly(methyl methacrylate) system has been studied and found to vary in the form of $\chi \sim a+b/T$. Others have investigated the actual temperature dependence of the domain spacing resulting from a change in $\chi$ at a temperature greater than the glass-transition temperature for both blocks. A theoretical prediction for the domain spacing in block copolymer melts (in the strong segregation limit) was proposed by Semenov to be $d \sim aN^{2/3}\chi^{1/6}$. Since $\chi \sim T^{-1}$, the change in domain spacing in a block copolymer melt would vary as $\sim T^{1/6}$. Experimentally $d \sim T^{-1/3}$ behavior has been found in the poly(styrene)-poly(butadiene) (PS-PB) system, with PS spheres in a matrix of PB and a solvent that was selective for PB (n-tetradecane). The temperature dependence of the domain size was also explored for a lamellar poly(styrene)-poly(isoprene) block copolymer in a neutral solvent (a solvent that is equally good for either block) and was found to scale as $\sim N^{2/3}(\Phi_p/T)^{1/3}$ where N is the degree of polymerization, $\Phi_p$ is the polymer volume fraction, and T is temperature in Kelvin.

A change in the interaction parameter between two polymers may cause changes in the domain spacing, and has been suggested as the major cause of temperature dependence in a photonic block copolymer in a neutral solvent. It may not have been the controlling factor in the temperature-dependent reflectivity of the samples under study because in these PS-P2VP samples, swollen in extremely selective solvents, the polystyrene layers are "frozen." This is because the temperature of the experiment is below the glass-transition point of the PS, and the extremely selective solvent serves to screen the interactions of the P2VP with the PS segments. In addition, it was observed that there were no systematic peak shifts in all samples: both the quaternized (FIGS. 18A-18B) and highly protonated (FIGS. 13A-13B and FIGS. 14A-14B) samples showed no peak shift while the methanol and 0.01M acetic acid samples showed different $d\lambda_{peak}/dT$ values. If domain spacing changes were driven by the temperature dependence of the $\chi$ parameter between the PS and P2VP, all samples should have exhibited a systematic peak shift with temperature.

Figure 15:
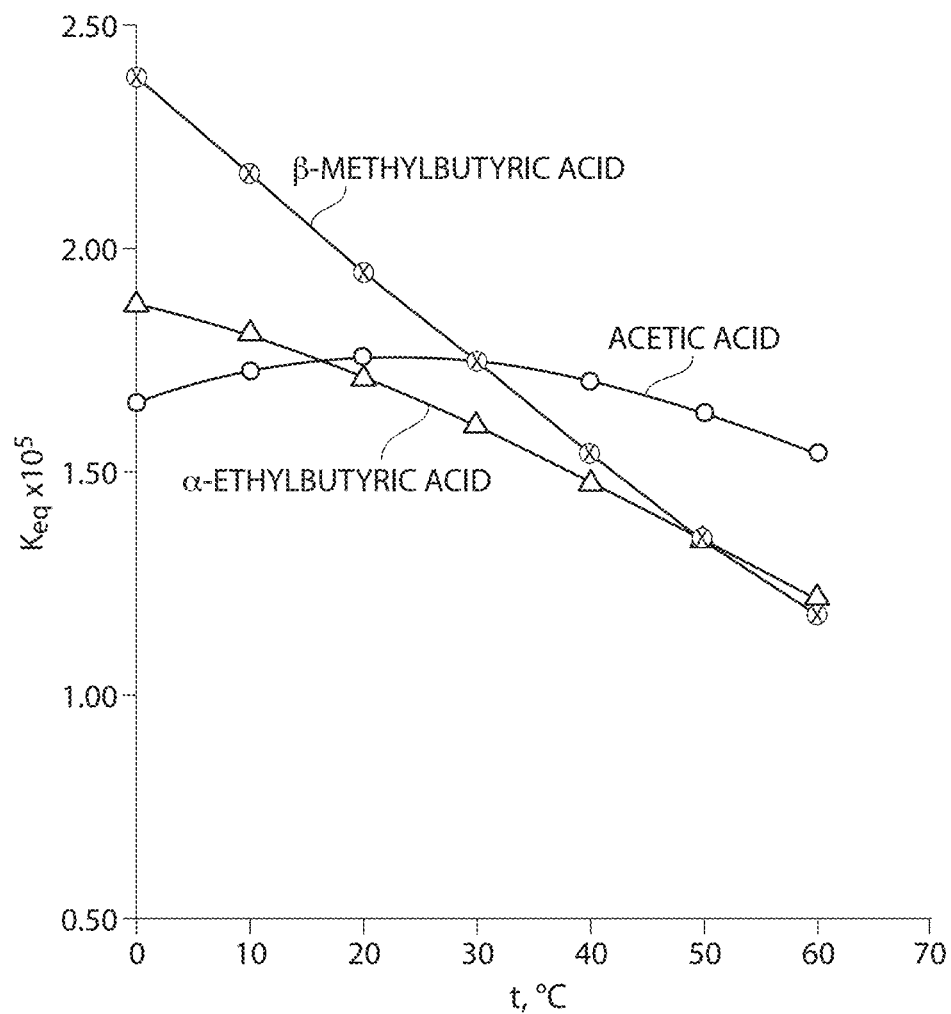
FIG. 15 includes a plot of $K_{eq}$ as a function of temperature according to one set of embodiments.

Taking a closer look at the protonated samples it was apparent that the rate of color change ($d\lambda_{peak}/dT$) mimicked that of the rate of change of color by changing the pH ($d\lambda_{peak}/d$-$\log [H^+]$). The 0.01M sample had a high degree of color tunability with temperature while the 1M sample did not change color at all. This suggested that the change in temperature was causing a change in protonation of the P2VP. There were two possible reasons for the change in protonation: a change in the pKa of the acid and a change in the pKa of the P2VP. A change in the pKa of the acid would have resulted in a change in pH while a change in the pKa of the P2VP would have resulted in a change in the number of protonated P2VP monomer units for a given pH level. FIG. 15 includes plots of the dependence of the equilibrium constant ($K_{eq}=10^{-pKa}$) for acetic acid (open circles), β-methylbutyric acid (closed circles) and α-ethylbutyric acid (triangles). For acetic acid, converting from the $K_{eq}$ data in FIG. 15 to pKa, a shift from a pKa value of 4.75 at room temperature to 4.78 at 5° C. is seen, which indicates that the solution is less acidic when cooled down. This increase in pH when cooling the solution from 25° C. to 5° C. accounts for a theoretical +0.2 nm/° C. shift in the reflectivity peak. The acids shown in FIG. 15 are attractive candidates to increase the reflectivity peak shift with temperature because of their decreasing acidity with increasing temperature.

Data on a temperature-related shift in $K_{eq}$ for the conversion of un-protonated to protonated P2VP could not be found in the literature, but reports in the literature suggest that pKa increases as temperature decreases for organic bases. Temperature-related shifts in the pKa of pyridine in a 50% methanol-water solution showed an increase in pKa from 3.81 at 50° C. to 4.14 at 20° C., and the change in pKa with temperature for pyridine in aqueous solutions is about −0.0111/° C. The shift in the pKa of P2VP from 25° C. to 5° C. can be calculated using the following relationship:

$$d(\text{pKa})/dT = -(\text{pKa}-0.9)/T$$

Figure 16:
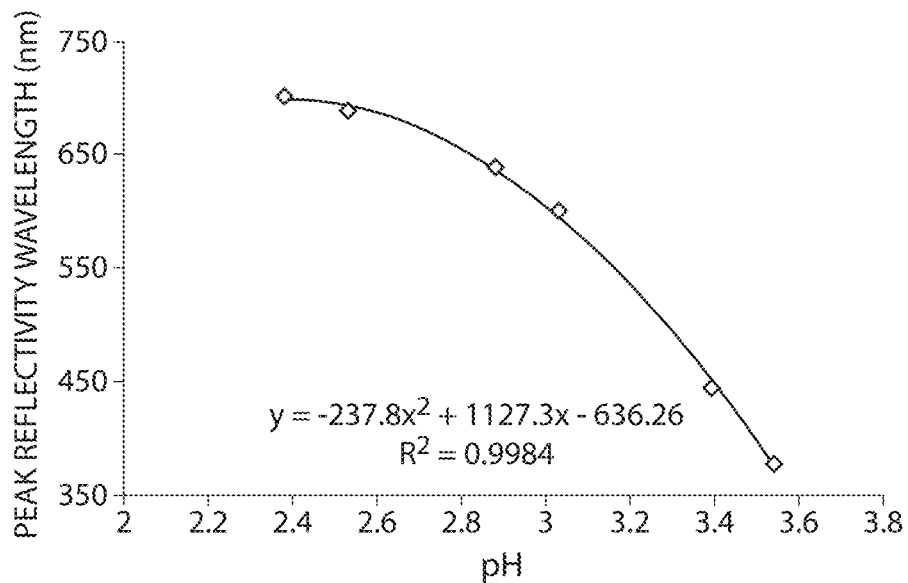
FIG. 16 includes a plot of peak reflectivity wavelength as a function of pH according to one set of embodiments.

To find the change in pKa with temperature, the pKa value of P2VP must be known. The pKa of P2VP has been reported to be 4.5 in a 0.5M potassium chloride solution (in water) at room temperature (electro-polymerized P2VP) and 3.45 in a 45% ethanol/55% water solution. Although neither of these values were measured in the same solution (or using the same polymerization technique) as those under consideration, an examination of the pH versus peak wavelength graph in FIG. 16 indicates that the latter value of 3.45 may be closer to the correct value. This assumption would yield a d(pKa)/dT value of $-8.6\times10^{-3}/°$ C. and thus a theoretical pKa of 3.62 at 5° C.

By calculating the percent ionization of the P2VP at room temperature for different pH levels and plotting that against the peak wavelength values for those same pH values, a master curve (FIG. 17) can be created that indicates the reflected wavelength for a given P2VP protonation percentage. This allows for the theoretical calculation of the reflected wavelength if the pKa and pH are known. This may permit the calculation of the percent ionization through the following relationship:

$$\% \text{ Protonation}=100/(1+10^{pH-pKa})$$

TABLE 4.3

Calculated and predicted values for the parameters affecting the thermal behavior of PS-P2VP

| Temperature | pH (.01M acetic acid) | P2VP pKa |
|---|---|---|
| 25° C. | 3.39 | 3.45 |
| 5° C. | 3.40 | 3.62 |

Figure 17:
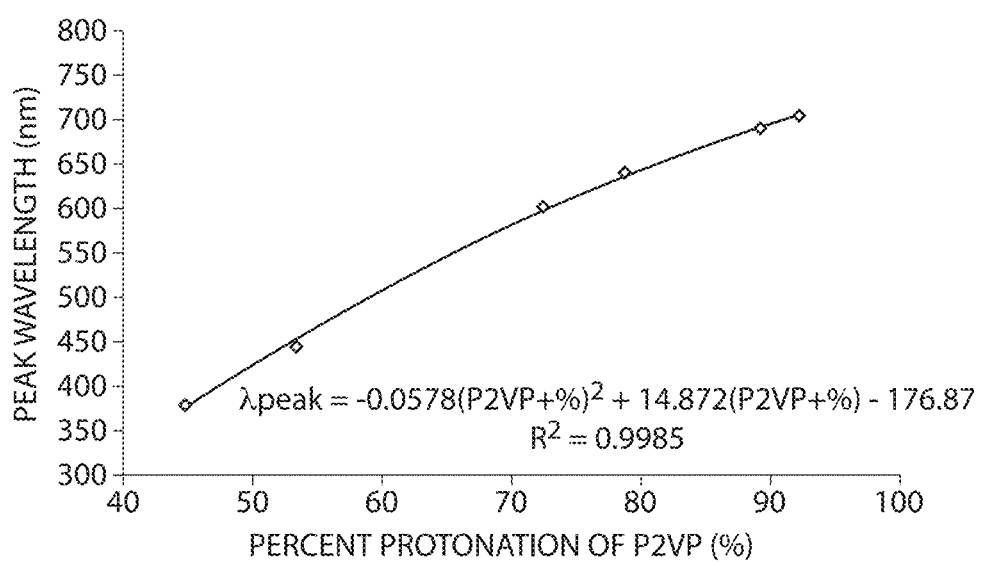
FIG. 17 includes a plot of peak wavelength as a function of the percent protonation of P2VP, according to one set of embodiments.

Using the equation in FIG. 17 with the values for percent ionization at 25° C. and 5° C., a peak shift of −3.6 nm/° C.

was calculated. This was roughly a factor of two higher than the observed ~−1.45 nm/° C. The difference may be attributed to errors in the prediction of the pKa of P2VP at 5° C. which assumed the entropy of the solution ($\Delta S°$) is constant with temperature. This may lead to errors the further from 25° C. that the pKa is extrapolated.

Quaternized PS-P2VP has a negligible amount of color change with temperature in de-ionized water. This may be because all available pyridine groups have been quaternized, and thus the polymer cannot be further protonated by the addition of an acid.

Figure 18A:
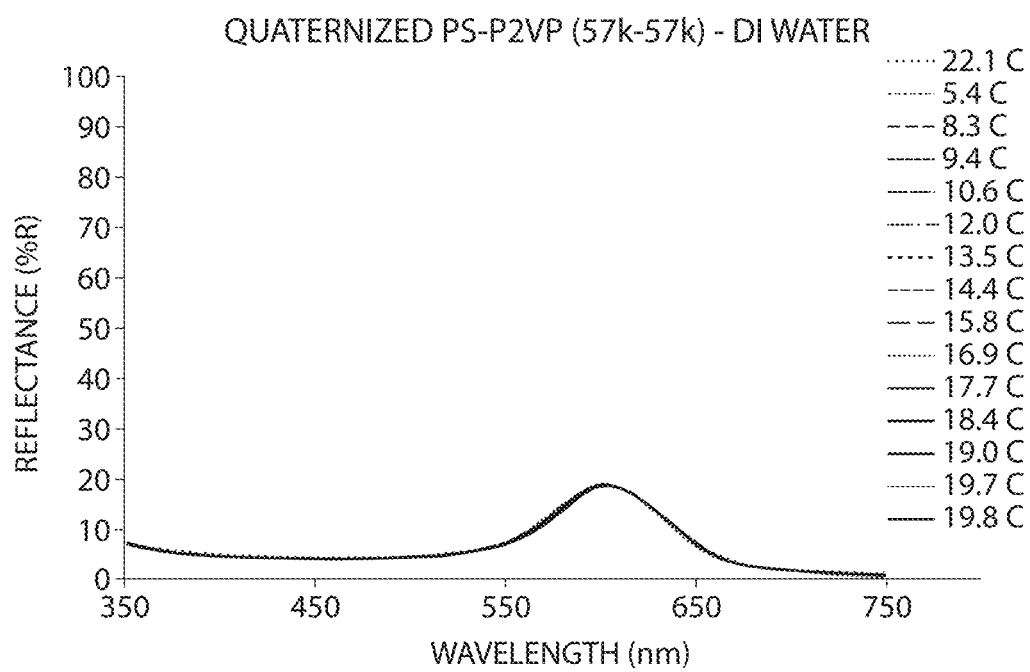
FIG. 18A is a plot of reflectance of a PS-QP2VP block polymer as a function of wavelength with DI water as the solvent, according to one set of embodiments.
Figure 18B:
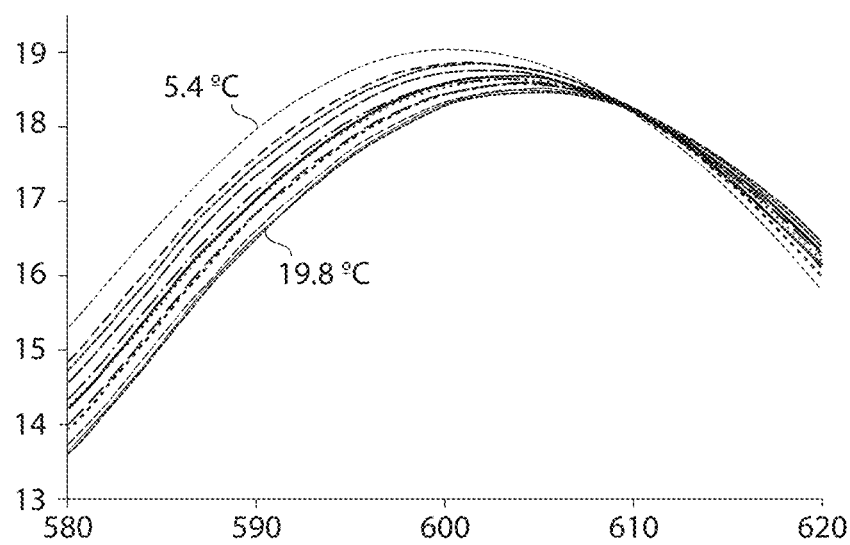
FIG. 18B is a plot of reflectance of a PS-QP2VP block polymer as a function of wavelength with DI water as the solvent, according to one set of embodiments.

A third set of experiments was carried out on a quaternized PS-P2VP BCP in deionized water to examine the temperature response when no acid was present but the P2VP was still charged. FIGS. 18A-18B illustrate a typical dataset for a deionized water-swollen sample. Temperature effects on the quaternized PS-P2VP sample were minimal. The percent quaternization was estimated to be approximately 75% by comparing the peak position with the curve in FIG. 17. Upon cooling the sample to 5.4° C., the peak position decreased by approximately four nanometers. When the sample was warmed, the reflectivity peak shifted to longer wavelengths and eventually surpassed the original position. The extremely small blue-shift was ascribed to the thermal expansion of the PS as well as the change in index of refraction of the constituent materials with temperature. The small but observable red shift was attributed to the replacement of the bromine counter ions (introduced during the quaternization procedure) with more hydrophilic hydroxide ions from the water. (This shift with a change in counter ion was irreversible unless the sample was immersed in a solution with excess bromide ions present, allowing them to diffuse back into the film.) As with the 0.1M and 1M acetic acid, there was no substantial peak movement over the temperature range probed by the experiment.

What is claimed:

1. A photonic material, comprising:
  a polymeric article including a periodic structure of a plurality of periodically occurring separate domains able to interact with and affect electromagnetic radiation, with at least a first and a second domain each having an electromagnetic radiation-affecting dimension of at least 5 nm, and each having a dielectric constant such that the domains define a dielectric constant ratio of at least 1.001 for at least one range of continuous wavelengths lying within a range of from 10 nm to 10 microns,
  wherein, in the presence of an altering stimulus, the electromagnetic radiation-affecting dimension of one of the domains changes relative to that of the other due to swelling and/or de-swelling of at least one of the domains, and a diffracted wavelength of electromagnetic radiation, having a diffracted wavelength greater than 700 nm, changes by at least 10 nm at a set point of observation relative to the photonic material.

2. The photonic material of claim 1, wherein at least a portion of the polymeric article comprises a gel or polyelectrolyte.

3. The photonic material of claim 1, wherein the polymeric article comprises a block copolymer.

4. The photonic material of claim 3, wherein the block copolymer comprises at least one domain comprising a gel or polyelectrolyte.

5. The photonic material of claim 3, wherein the block copolymer is polystyrene-quaternized-poly-(2-vinyl pyridine).

6. The photonic material of claim 1, wherein the altering stimulus is a temperature change, a pH change, a fluid, electromagnetic radiation, an electric field, a magnetic field, a chemical agent, or pressure.

7. The photonic material of claim 1, wherein the diffracted wavelength of electromagnetic radiation changes by at least 25 nm at the set point of observation relative to the photonic material.

8. The photonic material of claim 1, wherein the diffracted wavelength of electromagnetic radiation changes by at least 50 nm at the set point of observation relative to the photonic material.

9. The photonic material of claim 1, wherein the diffracted wavelength of electromagnetic radiation changes by at least 100 nm at the set point of observation relative to the photonic material.

10. The photonic material of claim 1, wherein the diffracted wavelength of electromagnetic radiation changes by at least 150 nm at the set point of observation relative to the photonic material.

11. The photonic material of claim 1, wherein the diffracted wavelength of electromagnetic radiation changes by at least 200 nm at the set point of observation relative to the photonic material.

12. The photonic material of claim 1, wherein the diffracted wavelength of electromagnetic radiation changes by at least 250 nm at the set point of observation relative to the photonic material.

13. The photonic material of claim 1, wherein the dielectric constant ratio is at least 1.01.

14. The photonic material of claim 1, wherein the dielectric constant ratio is at least 1.1.

15. The photonic material of claim 1, wherein the dielectric constant ratio is at least 1.25.

16. The photonic material of claim 1, wherein the dielectric constant ratio is at least 1.5.

17. The photonic material of claim 1, wherein the dielectric constant ratio is at least 1.75.

18. The photonic material of claim 1, wherein the dielectric constant ratio is at least 2.0.

* * * * *